US012097572B2

United States Patent
Galbraith et al.

(10) Patent No.: US 12,097,572 B2
(45) Date of Patent: Sep. 24, 2024

(54) SYSTEMS AND METHODS FOR MONITORING AND/OR CONTROLLING WOBBLE-PROCESSING USING INLINE COHERENT IMAGING (ICI)

(71) Applicant: IPG PHOTONICS CORPORATION, Oxford, MA (US)

(72) Inventors: Christopher M. Galbraith, Ottawa (CA); Jordan A. Kanko, Kingston (CA); Paul J. L. Webster, Kingston (CA)

(73) Assignee: IPG PHOTONICS CORPORATION, Oxford, MA (US)

( * ) Notice: Subject to any disclaimer, the term of this patent is extended or adjusted under 35 U.S.C. 154(b) by 1081 days.

(21) Appl. No.: 16/515,892

(22) Filed: Jul. 18, 2019

(65) Prior Publication Data

US 2020/0023461 A1 Jan. 23, 2020

Related U.S. Application Data

(60) Provisional application No. 62/853,368, filed on May 28, 2019, provisional application No. 62/700,606, filed on Jul. 19, 2018.

(51) Int. Cl.
*B23K 26/03* (2006.01)
*B23K 26/06* (2014.01)
(Continued)

(52) U.S. Cl.
CPC .......... *B23K 26/032* (2013.01); *B23K 26/062* (2015.10); *B23K 26/0648* (2013.01);
(Continued)

(58) Field of Classification Search
CPC .... B23K 26/032; B23K 31/125; B23K 26/03; B23K 26/04; B23K 26/044;
(Continued)

(56) References Cited

U.S. PATENT DOCUMENTS 3,303,319 A 2/1967 Steigerwald
3,471,215 A 10/1969 Snitzer
(Continued)

FOREIGN PATENT DOCUMENTS

CA 2728950 A1 3/2012
DE 10155203 6/2003
(Continued)

OTHER PUBLICATIONS

International Search Report and Written Opinion mailed Oct. 24, 2019, issued in PCT Patent Application No. PCT/US19/42436, 8 pages.
(Continued)

*Primary Examiner* — Chris Q Liu
(74) *Attorney, Agent, or Firm* — Grossman, Tucker, Perreault & Pfleger, PLLC

(57) ABSTRACT

A system and method may be used to monitor and/or control material processing where a process beam is moved in a wobble pattern, such as a wobble-welding process. While at least one process beam is moved according to a wobble pattern on a processing site (e.g., a weld site) of a workpiece, an ICI system moves an imaging beam at least partially independently of the process beam to one or more measurement locations on the wobble pattern and obtains ICI measurements (e.g., depth measurements) at those locations. The ICI measurement(s) may be used, for example, to evaluate keyhole and/or melt pool characteristics during a welding process. Although the present application describes wobble welding processes, the systems and methods described herein may also be used with other material processing applications where a laser or other energy beam is wobbled or dithered during processing including, without limitation, additive manufacturing, marking and material removal.

20 Claims, 13 Drawing Sheets

(51) Int. Cl.
    *B23K 26/062* (2014.01)
    *B23K 26/082* (2014.01)
    *G02B 26/10* (2006.01)
    *H01S 3/067* (2006.01)

(52) U.S. Cl.
    CPC .......... *B23K 26/082* (2015.10); *G02B 26/105* (2013.01); *H01S 3/067* (2013.01)

(58) Field of Classification Search
    CPC ............ B23K 26/0643; B23K 26/0648; B23K 26/244; B23K 15/0013; B23K 2101/006; B23K 2101/35; B23K 2103/04; B23K 2103/08; B23K 2103/50; B23K 26/034; B23K 26/042; B23K 26/043; B23K 26/046; B23K 26/0604; B23K 26/062; B23K 26/064; B23K 26/067; B23K 26/08; B23K 26/082; B23K 26/0821; B23K 26/083; B23K 26/0869; B23K 26/12; B23K 26/14; B23K 26/1462; B23K 26/16; B23K 26/21; B23K 26/24; B23K 26/28; B23K 26/32; B23K 26/38; B23K 26/382; B23K 9/02; B23K 9/095; B23K 9/1068; B23K 9/1735; B23K 9/188
    USPC ............ 219/121.64, 121.61, 121.63, 121.67, 219/121.83, 130.01, 137.71, 209
    See application file for complete search history.

(56) References Cited

U.S. PATENT DOCUMENTS

| | | | |
|---|---|---|---|
| 3,622,743 A | 11/1971 | Muncheryan | |
| 3,699,334 A | 10/1972 | Cohen et al. | |
| 4,618,262 A | 10/1986 | Maydan et al. | |
| 4,733,397 A | 3/1988 | Gallagher et al. | |
| 4,859,826 A | 8/1989 | Hess, III | |
| 4,892,098 A | 1/1990 | Sauer | |
| 5,132,509 A | 7/1992 | Hayakawa | |
| 5,153,409 A | 10/1992 | Rudaitis et al. | |
| 5,249,192 A | 9/1993 | Kuizenga et al. | |
| 5,339,323 A | 8/1994 | Hunter et al. | |
| 5,387,969 A | 2/1995 | Marantette | |
| 5,446,547 A | 8/1995 | Guenther et al. | |
| 5,631,171 A | 5/1997 | Sandstrom et al. | |
| 5,961,861 A | 10/1999 | McCay et al. | |
| 5,991,319 A | 11/1999 | Zamel et al. | |
| 6,004,314 A | 12/1999 | Wei et al. | |
| 6,043,870 A | 3/2000 | Chen | |
| 6,454,761 B1 | 9/2002 | Freedman | |
| 6,485,413 B1 | 11/2002 | Boppart et al. | |
| 6,669,686 B1 | 12/2003 | Singh | |
| 6,679,664 B2 | 1/2004 | Ikuta | |
| 6,755,819 B1 | 6/2004 | Waelti | |
| 6,763,259 B1 | 7/2004 | Hauger et al. | |
| 6,787,733 B2 | 9/2004 | Lubatschowski et al. | |
| 6,869,429 B2 | 3/2005 | Singh | |
| 7,411,682 B2 | 8/2008 | Moshe | |
| 7,436,520 B1 | 10/2008 | Doerband | |
| 7,619,746 B2 | 11/2009 | DeLega | |
| 7,688,453 B2 | 3/2010 | Willby et al. | |
| 7,817,319 B2 | 10/2010 | Pinard et al. | |
| 7,884,924 B2 | 2/2011 | Numata et al. | |
| 7,924,435 B2 | 4/2011 | Colonna De Lega et al. | |
| 8,264,694 B2 | 9/2012 | Mann et al. | |
| 8,410,392 B2 | 4/2013 | Kogel-Hollacher | |
| 8,487,209 B2 | 7/2013 | Sakamoto et al. | |
| 8,498,037 B2 | 7/2013 | Andreasch et al. | |
| 8,604,382 B2 | 12/2013 | Yano et al. | |
| 8,653,406 B2 | 2/2014 | Gubler et al. | |
| 8,735,768 B2 | 5/2014 | Urashima | |
| 8,822,875 B2 | 9/2014 | Webster et al. | |
| 8,982,339 B2 | 3/2015 | Schonleber et al. | |
| 9,457,428 B2 | 10/2016 | Webster et al. | |
| 9,757,817 B2 | 9/2017 | Webster | |
| 10,007,001 B1* | 6/2018 | LaChapelle | G01S 7/487 |
| 10,124,410 B2 | 11/2018 | Kanko et al. | |
| 2001/0008230 A1 | 7/2001 | Keicher et al. | |
| 2002/0153500 A1 | 10/2002 | Fordahl et al. | |
| 2002/0170889 A1 | 11/2002 | Faitel | |
| 2003/0055413 A1 | 3/2003 | Altshuler | |
| 2003/0196994 A1 | 10/2003 | Nikitin et al. | |
| 2003/0227514 A1 | 12/2003 | Nakashima | |
| 2005/0027199 A1 | 2/2005 | Clarke | |
| 2005/0133488 A1 | 6/2005 | Blankenship | |
| 2006/0179992 A1 | 8/2006 | Kermani | |
| 2007/0075054 A1 | 4/2007 | Nakamura | |
| 2007/0221639 A1 | 9/2007 | Yoshikawa | |
| 2008/0017619 A1 | 1/2008 | Yamakawa et al. | |
| 2008/0049285 A1 | 2/2008 | Pinard et al. | |
| 2008/0281413 A1 | 11/2008 | Culbertson et al. | |
| 2009/0032713 A1 | 2/2009 | Bhatia | |
| 2009/0144961 A1 | 6/2009 | Pinard | |
| 2009/0206066 A1 | 8/2009 | Rekowski | |
| 2009/0266801 A1 | 10/2009 | Oku | |
| 2010/0072180 A1 | 3/2010 | Schuermann | |
| 2010/0078419 A1 | 4/2010 | Johansen | |
| 2010/0133247 A1 | 6/2010 | Mazumder et al. | |
| 2010/0142780 A1 | 6/2010 | Yasuno et al. | |
| 2010/0155375 A1 | 6/2010 | Dietz et al. | |
| 2010/0288739 A1* | 11/2010 | Lee | G01B 11/02 219/121.67 |
| 2010/0324542 A1 | 12/2010 | Kurtz | |
| 2011/0222024 A1 | 9/2011 | Lu | |
| 2011/0284508 A1 | 11/2011 | Miura et al. | |
| 2011/0297654 A1 | 12/2011 | Yoshikawa et al. | |
| 2012/0045169 A1 | 2/2012 | Hu | |
| 2012/0138586 A1 | 6/2012 | Webster et al. | |
| 2012/0234805 A1 | 9/2012 | Schwarz | |
| 2012/0285936 A1 | 11/2012 | Urashima et al. | |
| 2012/0318775 A1 | 12/2012 | Schwarz | |
| 2013/0064706 A1 | 3/2013 | Schwarze et al. | |
| 2013/0120740 A1 | 5/2013 | Schonleber | |
| 2014/0063454 A1* | 3/2014 | Kamada | A61B 3/14 351/206 |
| 2014/0263207 A1 | 9/2014 | Liu | |
| 2014/0275986 A1 | 9/2014 | Vertikov | |
| 2014/0291304 A1 | 10/2014 | Mudd, II | |
| 2015/0048068 A1 | 2/2015 | Matsushita et al. | |
| 2015/0338210 A1 | 11/2015 | Lessmuller et al. | |
| 2015/0352668 A1 | 12/2015 | Scott et al. | |
| 2016/0039045 A1 | 2/2016 | Webster | |
| 2016/0039046 A1 | 2/2016 | Franz | |
| 2016/0059347 A1 | 3/2016 | Kogel-Hollacher et al. | |
| 2016/0161752 A1 | 6/2016 | Negoita et al. | |
| 2016/0193694 A1 | 7/2016 | Dinkelman | |
| 2016/0202045 A1 | 7/2016 | Schonleber et al. | |
| 2016/0368089 A1 | 12/2016 | Grapov et al. | |
| 2017/0120337 A1† | 5/2017 | Kanko | |
| 2017/0120377 A1 | 5/2017 | Webster et al. | |
| 2017/0297144 A1 | 10/2017 | Nakanishi | |
| 2019/0143458 A1† | 5/2019 | Strebel | |

FOREIGN PATENT DOCUMENTS

| | | |
|---|---|---|
| DE | 10155203 A1 | 6/2003 |
| DE | 102007032743 | 1/2009 |
| DE | 102007032743 A1 | 1/2009 |
| DE | 102010016862 | 9/2011 |
| DE | 102013008269 | 11/2014 |
| DE | 102015015330 | 6/2017 |
| DE | 102015015330 A1 † | 6/2017 |
| DE | 102016010508 | 3/2018 |
| EP | 1238744 | 9/2002 |
| EP | 1977850 | 10/2008 |
| EP | 1977850 A1 | 10/2008 |
| EP | 2708307 | 3/2014 |
| EP | 3710196 B1 | 1/2022 |
| JP | 57167692 | 10/1982 |
| JP | H08192286 A | 7/1996 |
| JP | H11320159 A | 5/1998 |
| JP | 2000263276 | 9/2000 |
| JP | 3126788 | 11/2001 |

(56) References Cited

FOREIGN PATENT DOCUMENTS

| | | |
|---|---|---|
| JP | 2003290944 | 10/2003 |
| JP | 2007268610 A | 10/2007 |
| JP | 2010501354 A | 1/2010 |
| JP | 2010-162561 | 7/2010 |
| JP | 2011173146 | 9/2011 |
| JP | 2012024808 A | 2/2012 |
| JP | 2012110905 A | 6/2012 |
| JP | 2014046330 A | 3/2014 |
| JP | 2017113789 A | 6/2017 |
| WO | 2007038975 A1 | 12/2007 |
| WO | 2009-146697 | 12/2009 |
| WO | 2012037694 | 3/2012 |
| WO | 2012152881 | 11/2012 |
| WO | 2013102912 A2 | 7/2013 |
| WO | 2014138939 | 9/2014 |
| WO | 2014170735 A1 | 10/2014 |
| WO | 2016025701 | 2/2016 |
| WO | 2017139769 | 8/2017 |

OTHER PUBLICATIONS

International Search Report and Written Opinion, mailed May 17, 2018, in related International Application No. PCT/US18/14218.
Matsunawa et al.; "Dynamics of Keyhole and Molten Pool in Laser Welding"; Journal of Laser Applications 10, 247 (1998); https://doi.org/10.2351/1.521858.
Gu, Hongping; "Real-Time Monitoring and Adaptive Control of CO2 Laser Beam Welding"; A thesis presented to the University of Waterloo; Waterloo, Ontario, Canada, 1998.
Postma, S., Postma, S., Aarts, R. G. K. M., Meijer, J., & Jonker, J. B. (2002). "Penetration control in laser welding of sheet metal." Journal of Laser Applications, 14(4), 210-214. DOI: 10.2351/1.1493764.
Fabbro et al; "Keyhole Modeling During Laser Welding"; Journal of Applied Physics; vol. 87; No. 9; May 1, 2000; pp. 4075-4083.
Bardin et al; "Process Control of Laser Keyhole Welding"; International Congress of Applications of Lasers and Electro-Optics 2004; 1008 (2004); doi: 10.2351/1.5060185; Published by Laser Institute of America; 11 pages.
Young, Thomas (1807). A Course of Lectures on Natural Philosophy and the Mechanical Arts.
Born, Max; Wolf, Emil (1999). Principles of Optics (7th expanded ed.).
Dilthey, U.; Handbuch zum BMBF-Projektverband "Qualifizierung von Laserverfahren" im Rahmen des Forderkonzeptes Laser 2000; DVS-Verl., 2000, ISBN 3-87155-906-7 along with English translation; pp. 117-120.
Annex from Communication mailed Nov. 30, 2018 in corresponding European Patent Application No. 11826290.6.
Observations by third party mailed Jan. 31, 2019 in connection with corresponding European Patent Application No. 11826290.6.
Bautze et al; "Keyhole Depth is just a Distance"; Laser Technik Journal dated Apr. 2014, pp. 39-43.
Extended European Search Report from related Application No. 19837754.1, mailed Mar. 9, 2022. 146 pages.
Third-Party Pre-Issuance Submission for U.S. Appl. No. 16/515,892, filed Jul. 16, 2020, mailed and notified by US Patent Office on Jul. 23, 2020.
International Search Report and Written Opinion for International Application No. PCT/CA2011/050599 dated Dec. 8, 2011.
Kanko, Jordan A., et al., "In situ morphology-based defect detection of selective laser melting through inline coherent maging", Journal of Materials Processing Technology 231, 488-500. Dec. 29, 2015.
Leung, B.Y.C., et al., "Real-time coherent imaging of ultrafast ablation", Optical Society of America, CthG4 (2009).
Ohmi, M., et al., "In-situ observation of tissue laser ablation using optical coherence tomography", Optical and Quantum Electronics, vol. 37, 1175-1183 (2005).
Vakoc, B.J., et al., "Real-time microscopic visualization of tissue response to laser thermal therapy", Journal of Biomedical Optics, vol. 12 (2), 020501-1-020501-3 (Mar./Apr. 2007).
Weisner, M., et al., "Optical coherence tomography for process control of laser micromachining", Review of Scientific Instruments, vol. 81, 033705-1-033705-7 (2010).
Webster, P.J.L., et al., "Inter- and intrapulse dynamics and feedback control for laser machining", Optical Society of America, CF16 (2009).
Webster, P.J.L., et al., "In situ 24 kHz coherent imaging of morphology change in laser percussion drilling", Optics Letters, vol. 35, No. 5, 646-648 (2010).
Webster, P.J.L., et al., "High speed in situ depth profiling of ultrafast micromachining", Optics Express, vol. 15, No. 23, 14967-14972 (2007).
Yu, J.X.Z., et al., "High quality percussion drilling of silicon with a CW fiber laser", Proceedings of SPIE Photonics West: LASE, San Francisco, CA, (2010).
Muller, M.S., et al., "Ultrafast technology applied to optical coherence tomography" La Physique Au Canada, vol. 65, No. 2, 93-86 (2009).
Leung, B.Y.C., et al., "Real-time guidance of thermal and ultrashort pulsed laser ablation in hard tissue using inline coherent imaging", Lasers in Surgery and Medicine, vol. 44, No. 3, 249-256 (2012).
Webster, P.J.L., et al., "Automatic real-time guidance of laser machining with inline coherent imaging", J. Laser Appl., vol. 23, No. 2, 022001 (2011).
Buzug, T.M., et al., "Navigation concept for image-guided laser surgery", Proc Int. IEEE Conf. Mechatronics Robotics 1403-1408 (2004).
Hohlweg-Majert, B., et al., "Bone treatment laser-navigated surgery", Lasers Med. Sci., vol. 25(1), 67-71 (2010).
Stopp, S., et al., "A new concept for navigated laser surgery", Lasers Med. Sci., vol. 23(3), 261-266 (2008).
Stopp, S., et al., "A new approach for creating defined geometries by navigated laser ablation based on volumetric 3-D data", IEEE Trans. Biomed Eng., vol. 55(7), 1872-1880 (2008).
Rupprecht, S., et al., "Sensor-based laser ablation for tissue specific cutting: an experimental study", Lasers Med. Sci., vol. 19(2), 81-88 (2004).
Fercher, A.F., et al., "Optical coherence tomography—principles and applications", Rep. Prog. Phys., vol. 66(2), 239-303 (2003).
Boppart, S.A., et al., "High-resolution optical coherence tomography-guided laser ablation of surgical tissue", J. Surg. Res., vol. 82, 275-284 (1999).
Oh, W.Y., et al., "Ultrahigh-speed optical frequency domain imaging and application to laser ablation monitoring", Appl. Phys. Lett., vol. 88(10) 103902 (2006).
Wang, Y., et al., "Low-noise broadband light generation from optical fibers for use in high-resolution optical coherence tomography", J. Opt. Soc. Am. A., vol. 22(8), 1492-1499 (2005).
Bonora, S., et al., "Low-threshold ablation of enamel and dentin using Nd:YAG laser assisted with chromophone with different pulse shapes", Proc. SPIE, vol. 4313, 23-30 (2004).
Li, Z.Z., et al., "Bone ablation with Er:YAG and CO2 laser: study of thermal and acoustic effects", Las. Surg. Med., vol. 12(1), 79-85 (1992).
Leech, P.W., "Laser ablation of multilayered hot stamping foil", J. Mater. Process. Technol. 209, 4281-4285 (2009).
Lausten, R., et al., "On-the-fly depth profiling during ablation with ultrashort laser pulses: a tool for accurate micromachining and laser surgery", Appl. Phys. Lett. 79(6), 884-886 (2001).
Webster, P.J.L., et al., "In-situ localization of machining dynamics with coherent microscopy", Canadian Laser Application Network (CLAN) Workshop, Mar. 12, 2009.
Webster, P.J.L., et al., "Coaxial real-time metrology and gas assisted laser micromachining: process development, stochastic behavior and feedback control", Proceedings of SPIE Photonics West MOEMS 759003-758003-10, San Francisco, CA (2010).
Webster, P.J.L., et al., "Guidance of hard tissue ablation by forward-viewing optical coherence tomography", Proceedings of SPIE, vol. 7554, 75540Z-75540Z-6 (2010).

(56) References Cited

OTHER PUBLICATIONS

Lindner, M.W., et al., "Spectral Radar: Optical Coherence Tomography in the Fourier Domain", in: Handbook of Optical Coherence Tomography, edited by E. Bourna and G.J. Teamey, Marcel Dekker, New York, pp. 335-357 (2002).

Webster, P.J.L., et al., "High speed observation of ultrafast machining dynamics", in Conference on Lasers and Electro-Optics p. CMF6 Optical Society of America, San Jose, CA (2008).

Webster, P.J.L., et al., "Inline coherent imaging of laser micromachining", International Symposium on Optomechatronic Technologies, Toronto, ON (2010).

Fraser, J.M., "In-situ coherent imaging to monitor and control laser processing", Harvard University Colloquium (2011).

Hofer, B., et al., "Signal post processing in frequency domain OCT and OCM using a filter bank approach", Proc. SPIE 6443, 644300 (2007).

Hofer, B., et al., "Dispersion encoded full range frequency domain optical coherence tomography", Optics Express, vol. 17 (1), 7-24 (2009).

Leung, B.Y.C., et al., "Real time Coherent Imaging of Ultrafast Ablation", Department of Physics, Engineering Physics and Astronomy, Queen's University, Kingston, Ontario, Canada, Jun. 4, 2009.

Webster, P.J.L., et al., "Inter- and Intra-pulse Dynamics & Feedback Control for Laser Machining", Queen's University, Kingston, Ontario, Canada.

Yu, J.X.Z., et al., "High-quality percussion drilling of silicon with a CW fiber laser", Department of Physics, Engineering Physics and Astronomy, Queen's University, Kingston, Ontario, Canada, Jan. 27, 2010.

Patel, N.A., et al., "Guidance of aortic ablation using optical coherence tomography", The International Journal of Cardiovascular Imagining 19, 171-178 (2003).

Wiesemann, W., "Process monitoring and closed-loop control", In: Landolt-Bornstein: Numerical Data and Functional Relationships in Science and Technology, Group VIII: Advanced Materials and Technologies, vol. 1: Laser Physics and Application, subvolume 1C: Laser Applications, Springer, pp. 243-275 (2004).

International Search Report and Written Opinion for PCT/CA2014/000273, dated Jun. 26, 2014.

Extended European Search Report for European Patent Application No. 147644437.1, dated Dec. 5, 2016.

Ngo, A., et al., "Laser Welding of Urinary Tissues, Ex Vivo, Using a Tunable Thulium Fiber Laser", SPIE 6078, Photonic Therapeutics and Diagnostics II, vol. 6078, 60781B-1-60781B-8 (2006).

Choi, E.S., et al., "Optical Coherence Tomography in Material Deformation by Using Short Pulse Laser Irradiation", SPIE, 6847, Coherence Domain Optical Methods and Optical Coherence Tomography in Biomedicine XII, 68470W-1-68470W-8 (2008).

Third Party Submission filed on Jun. 3, 2013 for U.S. Appl. No. 13/245,334.

Third Party Observation filed on Dec. 18, 2014 for EP Patent Application No. 11826290.6.

Schmitt, R., et al., "Inline process metrology system for the control of laser surface structuring processes", Physics Procedia 39, 814-822 (2012).

Schmitt, R., "Process monitoring in laser micro machining", Photonik International, 57-59 (2013).

Canadian Examiner's Requisition dated Dec. 15, 2016 for Canadian Patent Application No. 2, 728, 950.

Supplementary European Search Report for European Application No. EP11826290.6, dated Jun. 2, 2017.

Notice of Allowance mailed Jan. 13, 2020 in corresponding U.S. Appl. No. 16/383,544.

European Communication Pursuant to Rule 114(2) EPC mailed Mar. 31, 2021 along with Observations by Third Party in corresponding European Patent Application No. 11826290.6.

Wikipedia; "Optical Coherence Tomography" dated Sep. 14, 2011.

Notice of Allowance mailed Apr. 20, 2020 in related U.S. Appl. No. 15/187,235.

Communication from US Patent Office mailed Jul. 2, 2019 regarding third-party submission under 37 CFR 1.290 received (2 pages).

Third-Party Submission Under 37 CFR 1.290 filed Jun. 27, 2019 in U.S. Appl. No. 16/076,151 (2 pgs); Third-Party Submission Under 37 CFR 1.290 Concise Description of Relevance (3 pgs); Third-Party Pre-Issuance Submission (33 pgs); and receipt of filing (3 pgs).

Cindy Goppold, Thomas Pinder and Patrick Herwig of Fraunhofer IWS, De Gruyter, Advanced Optical Technologies, vol. 5, Issue 1, pp. 61-70, published online on Feb. 4, 2016 (see https://www.degruyter.com/view/j/ aot.2016.5.issue-1/aot-2015-0059/aot-2015-0059.XML?format=INT).

European Communication dated Apr. 4, 2019 in connection with correspondence European Patent Application Serial No. 16812628.2.

PCT International Search Report and Written Opinion mailed Oct. 27, 2016, received in corresponding PCT Application No. PCT/US16/38382, 11 pgs.

PCT International Search Report and Written Opinion mailed Oct. 24, 2019 in correspondence PCT Application No. PCT/US19/42436.

Comments on Office Action from related JP application No. 2017-565705, mailed Apr. 18, 2021.

\* cited by examiner
† cited by third party

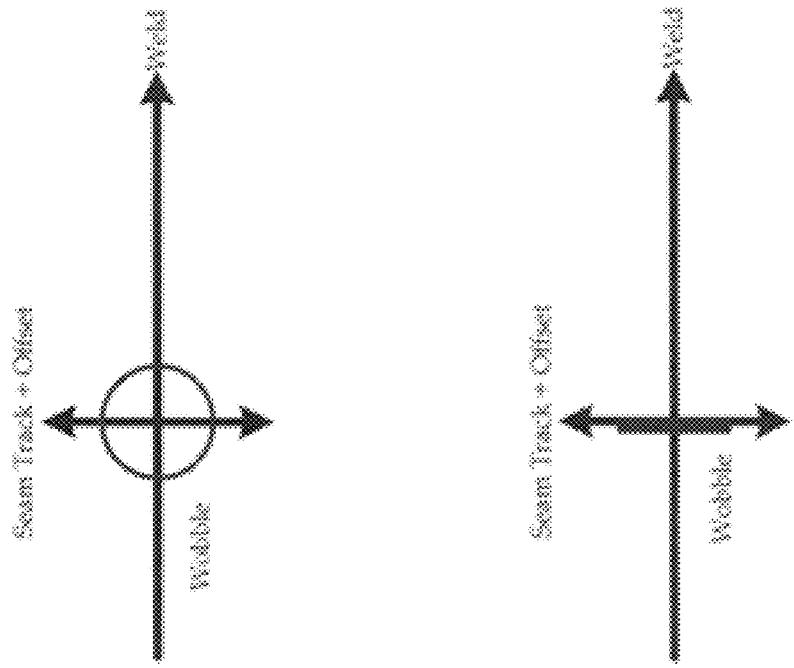
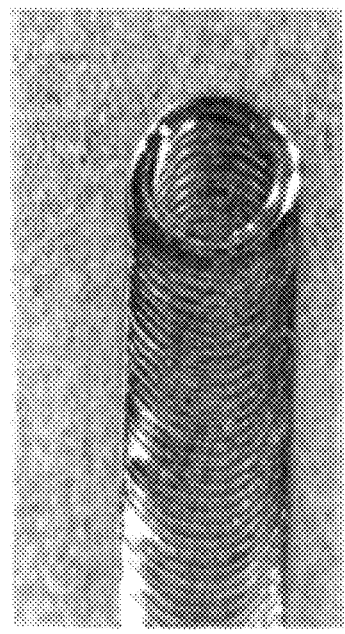
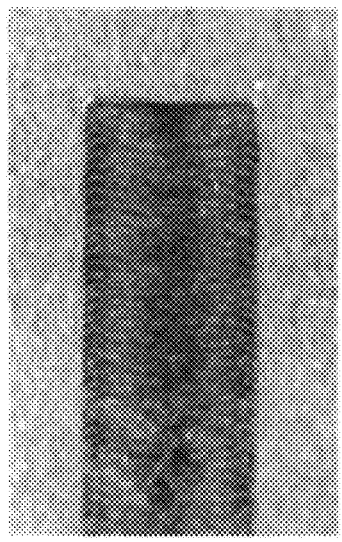
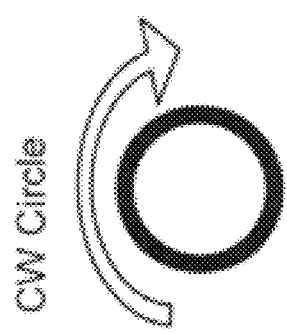
FIG. 2A
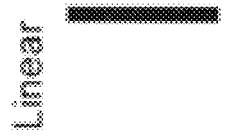
FIG. 2B

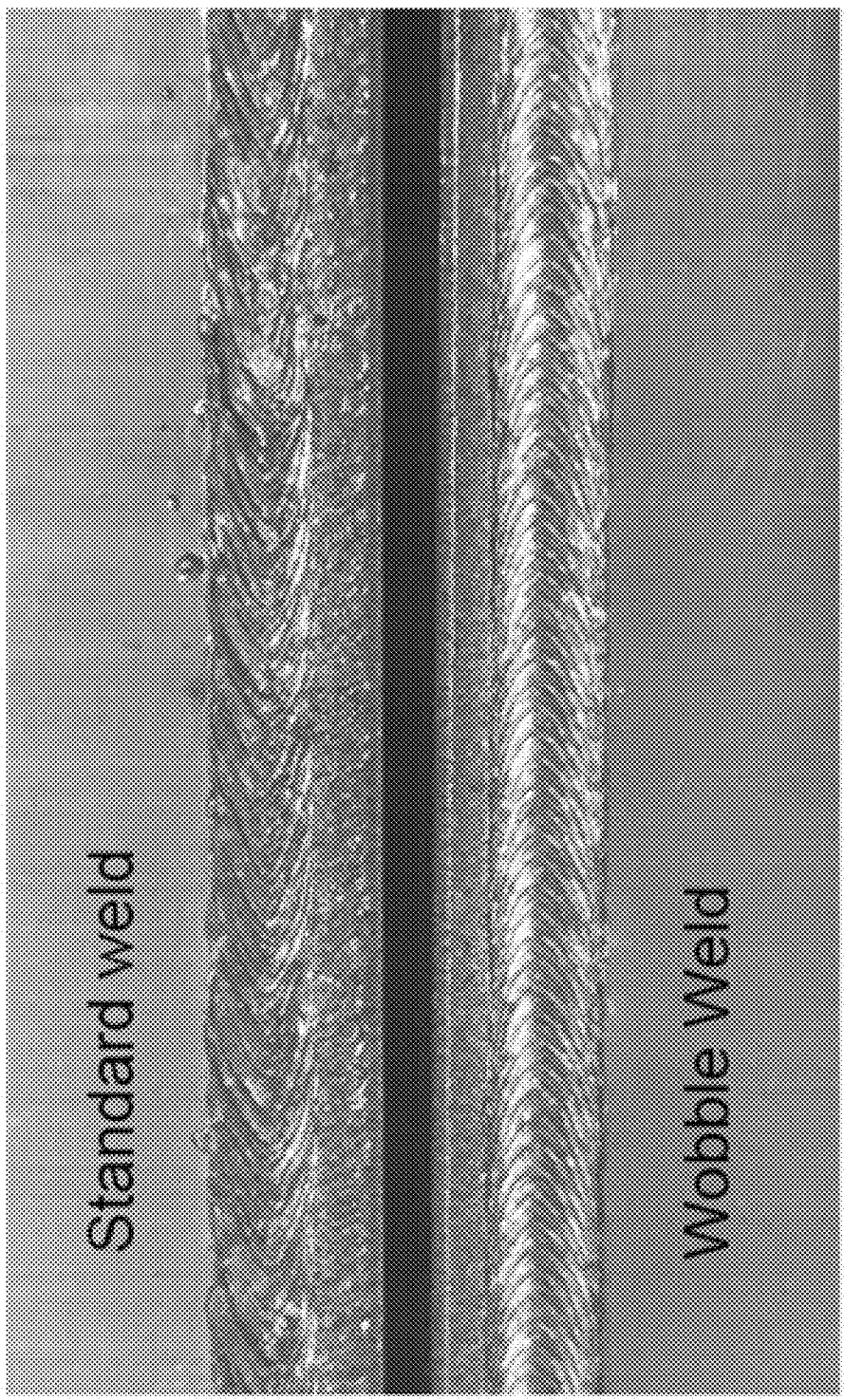
FIG. 3A Standard weld
FIG. 3B Wobble Weld

SYSTEMS AND METHODS FOR MONITORING AND/OR CONTROLLING WOBBLE-PROCESSING USING INLINE COHERENT IMAGING (ICI)

RELATED APPLICATIONS

The present application claims the benefit of U.S. Provisional Application Ser. No. 62/853,368 filed May 28, 2019, entitled Systems and Methods for Monitoring and/or Controlling Wobble-Welding Using Inline Coherent Imaging (ICI) and claims the benefit of U.S. Provisional Application Ser. No. 62/700,606 filed Jul. 19, 2018, entitled "Wobble-Welding of Copper and Aluminum Allows with Inline Coherent Imaging," both of which are fully incorporated herein by reference.

TECHNICAL FIELD

The present disclosure relates to monitoring and/or controlling material processing and more particularly, to systems and methods for using inline coherent imaging (ICI) to monitor and/or control material processing where a process beam is moved in a wobble pattern, such as wobble-welding

BACKGROUND INFORMATION

Laser welding of non-ferrous alloys for industrial applications is expanding but also presents some challenges. The low absorption of near-IR industrial laser wavelengths by aluminum and copper alloys, for example, resists initial formation of a keyhole, which may be necessary for efficient coupling of energy into the workpiece. Once a keyhole is established, the low viscosity of the melt (e.g., as compared to ferrous alloys) may result in reduced process stability and higher probability of defects.

For challenging materials, such as aluminum, copper and other non-ferrous alloys, combining high-brightness fiber laser sources (e.g., single-mode/low-mode) with dynamic beam deflection (or beam wobbling) may be an effective approach to precisely control the distribution of laser power on the material surface, while maintaining a high level of radiative intensity at the light-matter interaction site. One "wobble-welding" technique for moving the beam more quickly and precisely includes using movable mirrors to provide wobble patterns with the beam, for example, as disclosed in greater detail in U.S. Patent Application Publication No. 2016/0368089, which is commonly owned and fully incorporated herein by reference. Such wobble-welding processes may improve process stability, particularly when welding copper and aluminum, and may also provide reduced spatter and porosity and an extra degree of control over the finished weld geometry. Thus, stable, repeatable and controllable results have been demonstrated with potential for widespread industrial application.

More detailed investigation into the keyhole and melt pool dynamics that yield these industrially-favorable finished results would be of value to capitalize further on the value of wobble-welding techniques. The extra degrees of freedom introduced by wobble-welding may, however, further complicate the already difficult task of recording keyhole dynamics using process monitoring with photodiode-based sensors or high-speed cameras.

SUMMARY

According to one aspect, a laser material processing system includes a material modification beam source for generating a process beam and a processing head coupled to the material modification beam source and including at least one process beam scanning actuator, for directing and moving the process beam according to a wobble pattern in at least one axis on a processing site of a workpiece. An inline coherent imaging (ICI) system optically coupled to the processing head and includes at least one imaging beam scanning actuator for positioning the imaging beam at least partially independently of the process beam. A control system controls at least the material modification beam source, the process beam scanning actuator, and the imaging beam scanning actuator. The control system is programmed to cause the processing head to scan the process beam in the wobble pattern and to cause the imaging beam scanning actuator to move the imaging beam to a plurality of measurement locations on the processing site in coordination with the wobble pattern.

According to another aspect, a method is provided for monitoring a wobble-welding process. The method includes: directing a process beam and at least one imaging beam from an inline coherent imaging (ICI) system to a weld site of a workpiece; moving the process beam in a wobble pattern on the weld site of the workpiece; moving the at least one imaging beam at least partially independently from the process beam to a plurality of measurement locations on the weld site; and obtaining ICI measurements from the plurality of measurement locations as the process beam moves in the wobble pattern.

BRIEF DESCRIPTION OF THE DRAWINGS

These and other features and advantages will be better understood by reading the following detailed description, taken together with the drawings wherein:

FIGS. 2A-2D are schematic diagrams illustrating different wobble patterns together with sample welds formed by those wobble patterns, consistent with embodiments of the present disclosure.

FIG. 3A is a micrograph of a standard weld, consistent with an embodiment of the present disclosure.

FIG. 3B is a micrograph of a weld formed using a wobble pattern.

DETAILED DESCRIPTION

Figure 1:
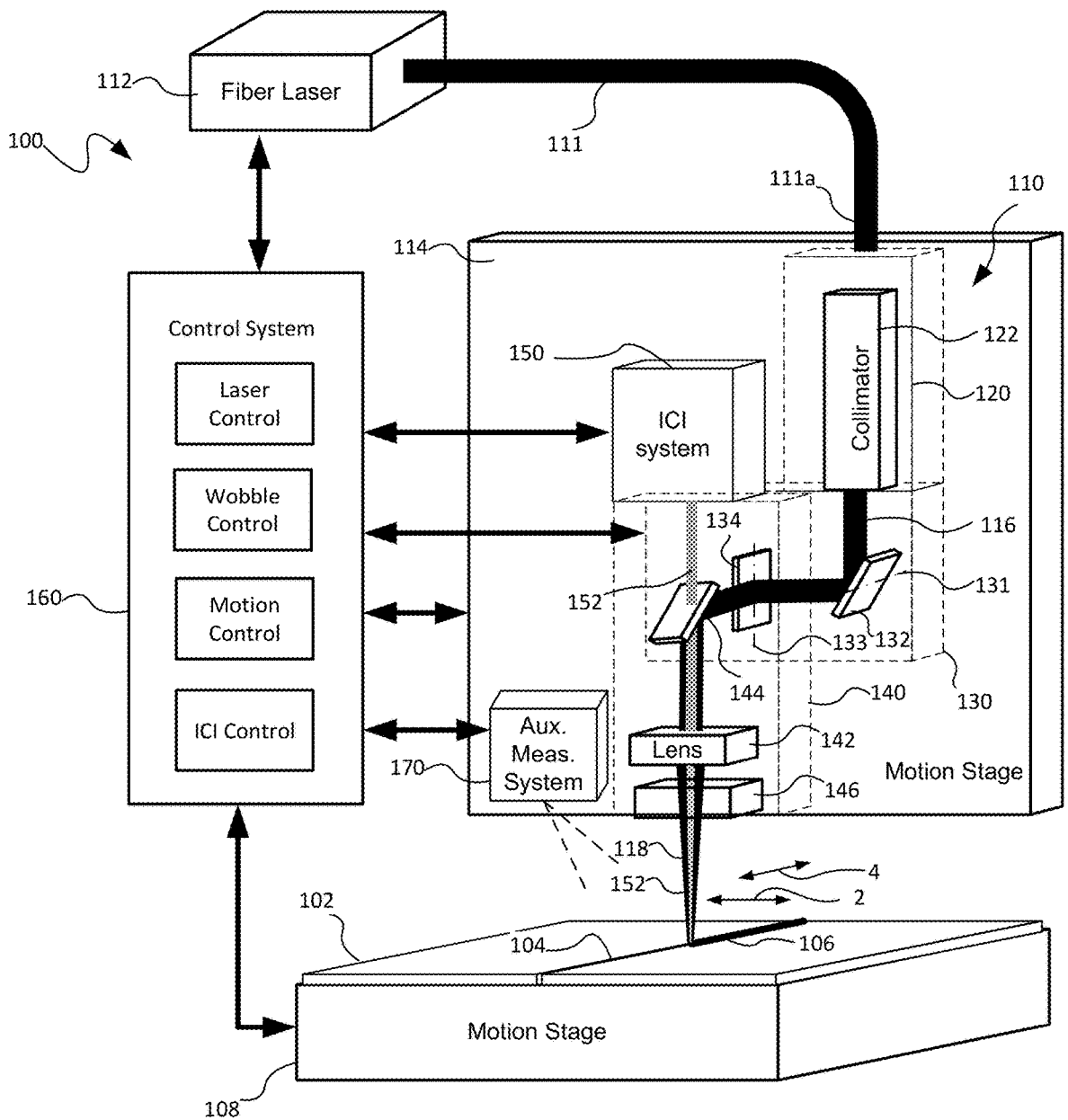
FIG. 1 is a schematic block diagram of a laser welding system that provides wobble welding patterns and is monitored using inline coherent imaging (ICI), consistent with embodiments of the present disclosure.

Systems and methods, consistent with embodiments of the present disclosure, use inline coherent imaging (ICI) to monitor and/or control material processing where a process beam is moved in a wobble pattern, such as a wobble-welding process. While at least one process beam is moved according to a wobble pattern on a processing site (e.g., a weld site) of a workpiece, an ICI system moves an imaging beam at least partially independently of the process beam to one or more measurement locations on the wobble pattern and obtains ICI measurements (e.g., depth measurements) at those locations. The ICI measurement(s) may be used, for example, to evaluate keyhole and/or melt pool characteristics during a welding process. Although the present application describes wobble welding processes, the systems and methods described herein may also be used with other material processing applications where a laser or other energy beam is wobbled or dithered during processing including, without limitation, additive manufacturing, marking and material removal.

In one embodiment, the imaging beam is moved to scan the weld site in a scan pattern (e.g., raster scan) across multiple measurement locations encompassing the wobble pattern to form a depth map of the weld site. In another embodiment, one or more imaging beams are moved to one or more fixed measurement locations on the wobble pattern. In a further embodiment, the imaging beam is moved along the wobble pattern in a direction opposite to the movement of the process beam. In yet another embodiment, the imaging beam is moved in a direction of the process beam along the wobble pattern but independently of the process beam, for example, to provide dynamic offset control and/or cyclic alignment correction.

As used herein, "wobble" refers to reciprocating movement of a laser beam (e.g., in at least one axis) and within a relatively small field of view defined by a scan angle of less than 10° or by a maximum beam angle displacement of ±5°. In one example, the ICI system may be used with a laser welding head with one or more scanning actuators, such as movable mirrors, which performs welding operations with wobble patterns, for example, as described in greater detail in U.S. Patent Application Publication No. 2016/0368089, which is commonly-owned and fully incorporated herein by reference. The scanning actuators provide a wobbling movement of one or more beams within a relatively small field of view, for example, defined by a scan angle of 1-2°. The scanning actuators may include, without limitation, galvanometer scanning mirrors, polygon scanning mirrors, MEMS-based scanning mirrors, piezoelectric scanning mirrors, diffraction-based beam scanners, rotating prisms, Potassium Tantalum Niobium Oxide (KTN) crystals, and other types of scanning mirrors or optics. The laser welding head may also include a diffractive optical element to shape the beam or beams being moved.

As used herein, inline coherent imaging (ICI) refers to a process where an imaging beam is directed to a workpiece together or "inline" with a process beam for purposes of measuring characteristics of the process and/or workpiece. The term "inline" does not require the imaging and process beams to be co-axial. The imaging beam may be co-axial with the process beam or may be offset or angled relative to the process beam. Embodiments described in the present disclosure may be used with any ICI systems, for example, as described in greater detail in U.S. Pat. Nos. 8,822,875, 9,757,817 and 10,124,410, which are commonly-owned and fully incorporated herein by reference. The ICI system may be coupled to the welding head downstream of the process beam scanning actuators and may include imaging beam scanning actuators to move the imaging beam independently of the process beam, as will be described in greater detail below. The scanning actuators may include, without limitation, galvanometer scanning mirrors, polygon scanning mirrors, MEMs-based scanning mirrors, piezoelectric scanning mirrors, diffraction-based beam scanners, rotating prisms, and other types of scanning mirrors or optics.

ICI may be used to monitor wobble welding in copper and aluminum alloys as well as other non-ferrous alloys. In particular, ICI allows direct, geometrical keyhole measurements and may be used to perform keyhole depth mapping within the wobble pattern to demonstrate periodic fluctuations in the keyhole corresponding to position, which are not always observable in a finished weld. Keyhole and melt pool dynamics may be examined for both revolving and common keyhole wobble welding conditions. ICI measurements may provide a unique window into the dynamics of welding processes that use dynamic beam deflection. ICI measurements, such as weld penetration depth or profiles and/or pre-process or post-process part measurements, may also be used to control processing parameters such as, for example, laser power or wobble pattern.

ICI provides advantages over conventional photodiode-based sensors or high-speed cameras when applied to measurement of laser keyhole welding processes. As will be described in greater detail below, ICI delivers a secondary imaging beam (e.g., an infrared beam) through the process optics to take direct geometric measurements of the keyhole, melt pool, and surrounding material during the weld. ICI provides the advantage of not being blinded by blackbody radiation or backscattered process light and is capable of directly measuring the penetration of the keyhole during a laser weld. ICI measurements are capable of micron-scale precision and microsecond-level temporal resolution. Using ICI to examine the behavior of the keyhole during wobble-welding yields new insights into the behavior of this type of welding process.

Referring to FIG. 1, a laser welding system 100 for wobble-welding may be monitored and/or controlled using an ICI system 150, consistent with embodiments of the present disclosure. The ICI system 150 may be used to monitor and/or control the wobble-welding by taking one or more ICI measurements at one or more locations in the weld site and along the wobble pattern, as will be described in greater detail below. Although the ICI system 150 is described in the context of a particular embodiment of the laser welding system 100, the ICI system 150 may be used with any type of laser welding systems for wobble-welding or with other material processing systems where a laser or energy beam is wobbled or dithered.

In the illustrated embodiment, the laser welding system 100 includes a laser welding head 110 coupled to an output fiber 111 of a fiber laser 112 (e.g., with a connector 111a). The laser welding head 110 may be used to perform welding on a workpiece 102, for example, by welding a seam 104 to form a weld bead 106. The ICI system 150 may be coupled to the laser welding head 110, for example, to a camera port or other optical port on the welding head 110.

The laser welding head 110 and/or the workpiece 102 may be moved or translated relative to each other along the direction of the seam 104. The laser welding head 110 may be located on a motion stage 114 for translating the welding head 110 relative to the workpiece 102 along at least one axis, for example, along the length of the seam 104. In one example, the motion stage 114 is a multiple axis robot such as an ABB IRB-4400 six-axis robot and the materials or workpiece is clamped in a static fixture. Additionally, or alternatively, the workpiece 102 may be located on a motion stage 108 for moving or translating the workpiece 102 relative to the laser welding head 110.

The fiber laser 112 may include an Ytterbium fiber laser capable of generating a laser in the near infrared spectral range (e.g., 1060-1080 nm). The Ytterbium fiber laser may be a single mode or multi-mode continuous wave Ytterbium fiber laser capable of generating a laser beam with power up to 1 kW in some embodiments and higher powers up to 50 kW in other embodiments. Examples of the fiber laser 112 include the YLR SM Series or YLR HP Series lasers available from IPG Photonics Corporation, such as the YLS-6000 fiber laser (1070 wavelength) delivered through a 100-μm-core process fiber laser. The fiber laser 112 may also include a multi-beam fiber laser, such as the type disclosed in International Application No. PCT/US2015/45037 filed 13 Aug. 2015 and entitled Multibeam Fiber Laser System, which is capable of selectively delivering one or more laser beams through multiple fibers.

In the illustrated embodiment, the laser welding head 110 generally includes a collimator 122 for collimating the laser beam from the output fiber 111, at least first and second movable mirrors 132, 134 for reflecting and moving the collimated beam 116, and a focus lens 142 for focusing and delivering a focused beam 118 to the workpiece 102. In one example, the welding head 110 is an IPG D50 Wobble weld head with a 150 mm collimator and a 300 mm final focusing optics (for a nominal focus diameter of 200 μm). The ICI system 150 may be coupled to the welding head 110 downstream of the movable mirrors 132, 134. In the illustrated embodiment, a fixed mirror 144 is also used to direct the collimated laser beam 116 from the second movable mirror 134 to the focus lens 142. The collimator 122, the movable mirrors 132, 134, and the focus lens 142 and fixed mirror 144 may be provided in separate modules 120, 130, 140 that may be coupled together, as will be described in greater detail below.

The movable mirrors 132, 134 are pivotable about different axes 131, 133 to cause the collimated beam 116 to move and thus to cause the focused beam 118 to move relative to the workpiece 102 in at least two different perpendicular axes 2, 4. The movable mirrors 132, 134 may be galvanometer mirrors that are movable by galvo motors, which are capable of reversing direction quickly. In other embodiments, other mechanisms may be used to move the mirrors such as stepper motors. Using the movable mirrors 132, 134 in the laser welding head 110 allows the laser beam 118 to be moved precisely, controllably and quickly for purposes of beam wobbling without having to move the entire welding head 110 and without using rotating prisms.

Figure 1A:
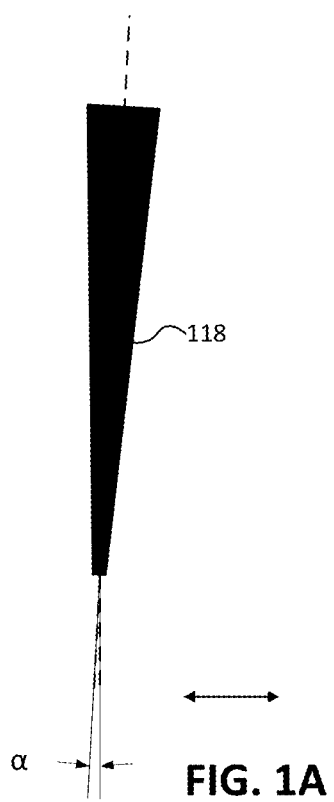
FIG. 1A is a schematic diagram of a focused laser beam with a relatively small range of movement provided by dual mirrors for purposes of wobbling, consistent with an embodiment of the present disclosure.

In an embodiment of the welding head 110, movable mirrors 132, 134 move the beam 118 within only a relatively small field of view (e.g., a maximum beam displacement at the workpiece of ±30 mm) by pivoting the beam 118 within a scan angle α of less than 10° (or with a maximum beam angle displacement of ±5°) and more particularly a scan angle of about 1-2°, as shown in FIG. 1A, thereby allowing the beam to wobble. In contrast, conventional laser scan heads generally provide movement of the laser beam within a much larger field of view (e.g., larger than 50×50 mm and as large as 250×250 mm) and are designed to accommodate the larger field of view and scan angle. Thus, the use of the movable mirrors 132, 134 to provide only a relatively small field of view in the laser welding head 110 is counter-intuitive and contrary to the conventional wisdom of providing a wider field of view when using galvo scanners. Limiting the field of view and the scan angle provides advantages when using galvo mirrors in the welding head 110, for example, by enabling faster speeds, allowing use with less expensive components such as lenses, and by allowing use with accessories such as air knife and/or gas assist accessories.

Because of the smaller field of view and scan angle in the example embodiment of the welding head 110, the second mirror 134 may be substantially the same size as the first mirror 132. In contrast, conventional galvo scanners generally use a larger second mirror to provide for the larger field of view and scan angle and the larger second mirror may limit the speed of movement in at least one axis. A smaller sized second mirror 134 (e.g., about the same size as the first mirror 132) in the welding head 110 thus enables the mirror 134 to move with faster speeds as compared to larger mirrors in conventional galvo scanners providing large scan angles.

The focus lens 142 may include focus lenses known for use in laser welding heads and having a variety of focal lengths ranging, for example, from 100 mm to 1000 mm. Conventional laser scan heads use multi-element scanning lenses, such as an F-theta lens, a field flattening lens, or a telecentric lens, with much larger diameters (e.g., a 300 mm diameter lens for a 33 mm diameter beam) to focus the beam within the larger field of view. Because the movable mirrors 132, 134 are moving the beam within a relatively small field of view, a larger multi-element scanning lens (e.g., an F-theta lens) is not required and not used. In one example embodiment of the welding head 110 consistent with the present disclosure, a 50 mm diameter plano convex F300 focus lens may be used to focus a beam having a diameter of about 40 mm for movement within a field of view of about 15×5 mm. The use of the smaller focus lens 142 also allows additional accessories, such as air knife and/or gas assist accessories, to be used at the end of the welding head 110. The larger scanning lenses required for conventional laser scan heads limited the use of such accessories.

Although the exemplary embodiment of the laser welding head 110 includes two movable mirrors 132, 134, other types and numbers of scanning actuators may also be used to provide the wobble pattern. Other optical components may also be used in the laser welding head 110 such as a beam splitter for splitting the laser beam to provide at least two beam spots for welding (e.g., on either side of the weld). Additional optical components may also include diffractive optics and may be positioned between the collimator 122 and the mirrors 132, 134.

A protective window 146 may be provided in front of the lens 142 to protect the lens and other optics from the debris produced by the welding process. The laser welding head 110 may also include a welding head accessory, such as an air knife for providing high velocity air flow across the protective window 146 or focus lens 142 to remove the debris and/or a gas assist accessory to deliver shield gas coaxially or off-axis to the weld site to suppress weld plume. Thus, the laser welding head 110 with movable mirrors is capable of being used with existing welding head accessories.

In the illustrated embodiment, the ICI system 150 is optically coupled to the laser welding head 110, for example, downstream of the mirrors 132, 134. The ICI system 150 generates an imaging beam 152 that is directed in-line with the process beam 118. The fixed mirror 144 may be a dichroic mirror that reflects the process beam 118 and allows the imaging beam 152 to pass through. The ICI system 150 includes one or more scanning actuators (not shown) to move the imaging beam 152 to the one or more measurement locations at the weld site and on the wobble pattern, as will be described in greater detail below. In one example, the ICI system 150 includes an IPG LDD-700 ICI system incorporating a secondary pair of galvanometer scanner mirrors, allowing the imaging beam to be positioned independently of the process beam. In other embodiments, the ICI system 150 may be optically coupled upstream of the mirrors 132, 134.

The illustrated embodiment of the laser welding system 100 further includes a control system 160 for controlling the fiber laser 112, the positioning of the movable mirrors 132, 134, and/or the motion stages 108, 114, for example, in response sensed conditions in the welding head 110, a detected location of the seam 104, and/or movement and/or a position of the laser beam 118. The control system 160 may also monitor and/or control the welding operation by receiving data from the ICI system 150, for example, representing depth measurements along the weld site.

The control system 160 may control the fiber laser 112, for example, by shutting off the laser, changing the laser power, or adjusting any other adjustable laser parameter. The control system 160 may also control the laser parameters (e.g., laser power) in response to movement or a position of the beam 118 without turning off the laser 112. If one of the movable mirrors 132, 134 moves the beam 118 out of range or too slowly, the control system 160 may reduce the laser power to control the energy of the beam spot dynamically to avoid damage by the laser. The control system 160 may further control selection of laser beams in a multi-beam fiber laser.

The control system 160 may control one or both of the movable mirrors 132, 134 to provide the wobble movement during welding, as described in greater detail below. The control system 160 may also control the scanning actuators in the ICI system 150 to control movements and/or positioning of the imaging beam 152 on the weld site as described below. The control system 160 may also include data processing systems to correct ICI measurements. The control system 160 may further include a record generator for generating records of the ICI measurements and a quality judgment system for performing quality analysis of welded parts.

The control system 160 thus includes laser control, wobble control, motion control and ICI control working together to control both the wobble-welding process and monitoring of the wobble-welding process. The control system 160 may include, for example, hardware (e.g., a general-purpose computer or microcontroller) and software known for use in controlling fiber lasers and galvo mirrors. Existing galvo control software may be used, for example, and modified to allow the galvo mirrors to be controlled as described herein.

The laser welding system 100 may also include an auxiliary measurement system 170 including auxiliary sensors such as visible and/or IR-sensitive photodiodes, and/or cameras, some of which may be coupled to the welding head 110 by way of optical fibers. The auxiliary measurement system 170 may be configured to measure process radiation, for example, within a spectral band of 100 nm to 20 µm. The auxiliary measurement system 170 may include optical elements, such as apertures, lenses, scanning mirrors, optical fibers (some of which may be coupled to the process laser, or ICI system itself), to perform spatially localized measurements relative to the process beam and/or the measurement beam. Examples of auxiliary sensors are described in greater detail in U.S. Pat. No. 10,124,410, which is incorporated herein by reference. One or more outputs from the auxiliary measurement system 170 may be used to dynamically offset the imaging beam from the process beam at the workpiece surface according to a position of the process beam within the wobble pattern during a welding process. The auxiliary measurement system 170 may be configured to perform the spatially localized measurement at a measurement location dynamically offset from the process beam based on at least one output from the ICI system.

Figure 2C:
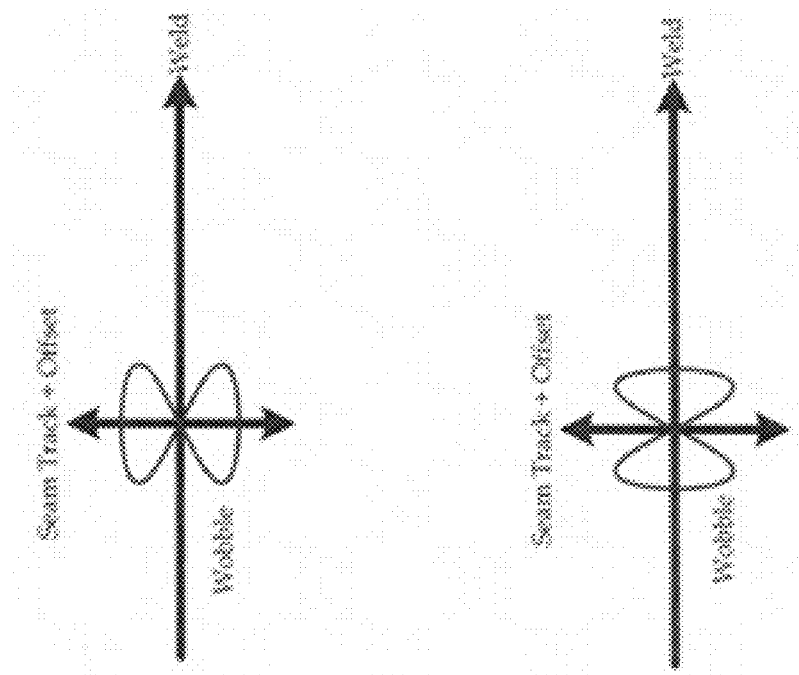
Figure 2D:
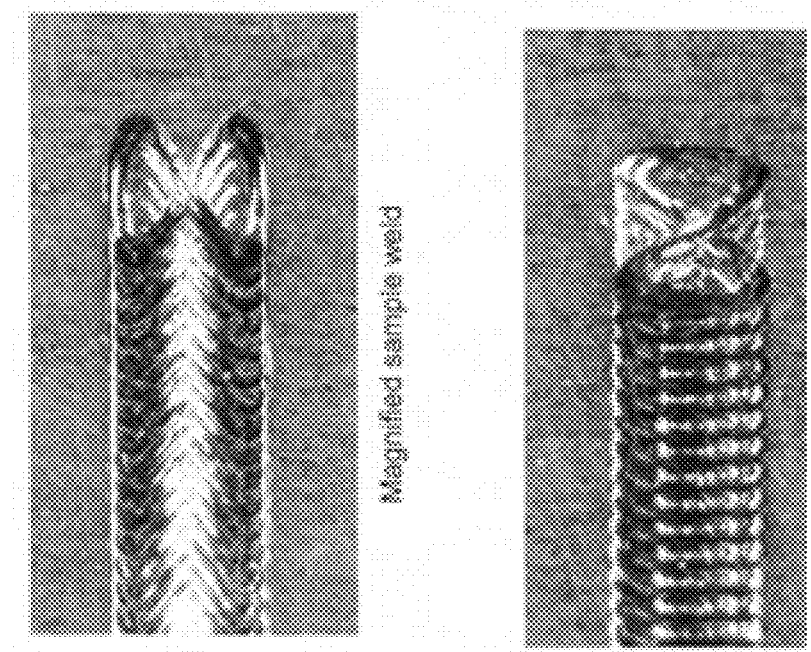

FIGS. 2A-2D illustrate examples of cyclical or repeating wobble patterns that may be used to perform stir welding of a seam together with sample welds formed thereby. FIGS. 2A and 2B show a clockwise circular pattern, FIG. 2B shows a linear pattern, FIG. 2C shows a FIG. 8 pattern, and FIG. 2D shows an infinity pattern. Although certain wobble patterns are illustrated, other wobble patterns are within the scope of the present disclosure including, without limitation, spiral patterns. One advantage of using the movable mirrors in the laser welding head 110 is the ability to move the beam according to a variety of different wobble patterns.

FIGS. 3A and 3B illustrate a comparison of standard weld with a weld formed by a wobble pattern. The laser welding systems and methods described herein may be used to improve welding with materials, such as titanium, that are typically difficult to weld.

Figure 5:
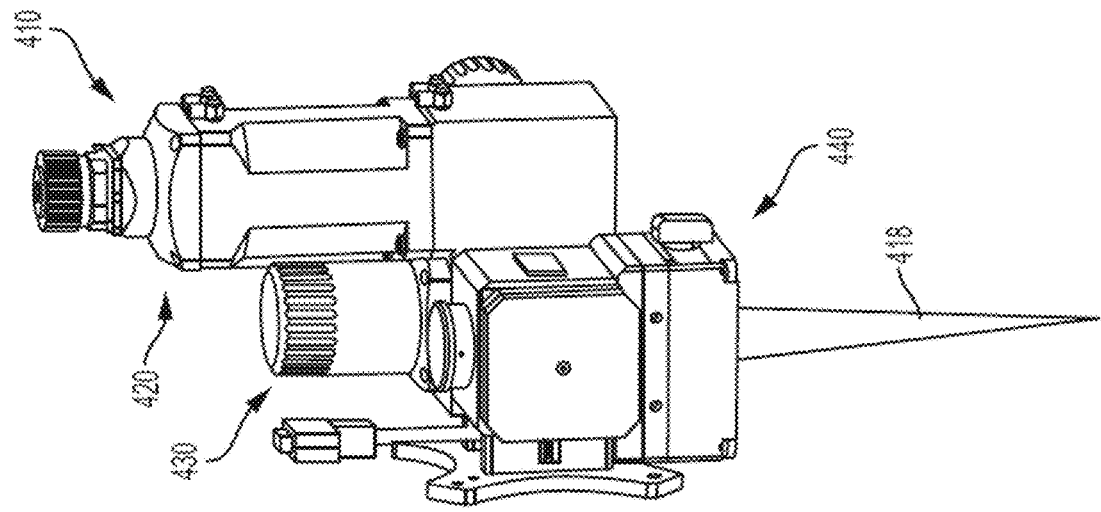
FIGS. 4 and 5 are perspective views of a laser welding head with a collimator module, wobbler module, and core block module assembled together and emitting a focused beam, consistent with an embodiment of the present disclosure.
Figure 4:
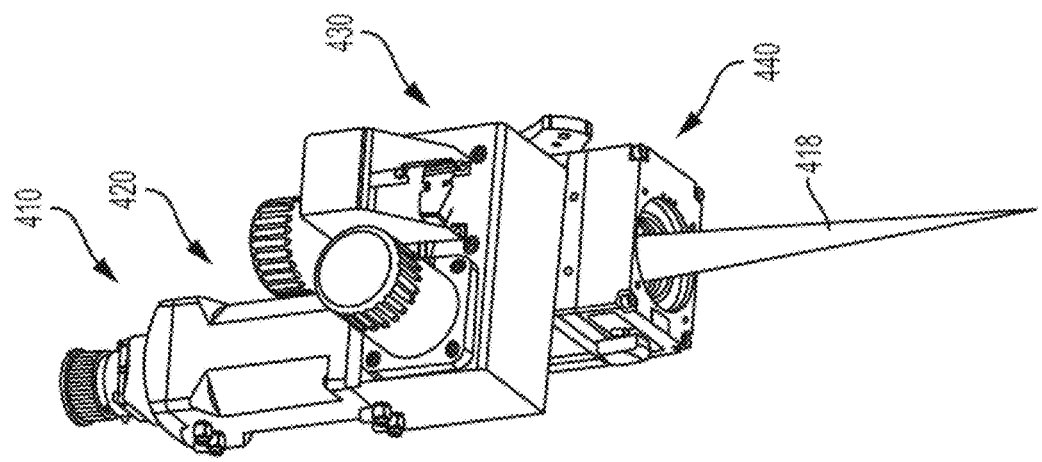

FIGS. 4 and 5 illustrate an example embodiment of a scanning laser welding head 410 in greater detail. Although one specific embodiment is shown, other embodiments of the laser welding head and systems and methods described herein are within the scope of the present disclosure. As shown in FIGS. 4 and 5, the laser welding head 410 includes a collimator module 420, a wobbler module 430, and a core block module 440. The wobbler module 430 includes the scanning actuator(s) such as the first and second movable mirrors as discussed above and is coupled between the collimator module 420 and the core block module 440.

The collimator module 420 may include a collimator (not shown) with a fixed pair of collimator lenses such as the type known for use in laser welding heads. In other embodiments, the collimator may include other lens configurations, such as movable lenses, capable of adjusting the beam spot size and/or focal point. The wobbler module 430 may include first and second galvanometers (not shown) for moving galvo mirrors (not shown) about different perpendicular axes. Galvanometers known for use in laser scanning heads may be used. The galvanometers may be connected to a galvo controller (not shown). The galvo controller may include hardware and/or software for controlling the galvanometers to control movement of the mirrors and thus movement and/or positioning of the laser beam. Known galvo control software may be used and may be modified to provide the functionality described herein, for example, the seam finding, the wobbler patterns, and communication with the laser. The core block module 440 may include a fixed mirror (not shown) that redirects the beam received from the wobbler module 430 to a focus lens and then to the workpiece. The ICI system may be coupled, for example, to the core block module 440 and the fixed mirror in the core block module 440 may be a dichroic mirror allowing the reflected imaging beam to pass back through to the ICI system, as will be described in greater detail below.

FIGS. 4 and 5 show the assembled laser welding head 410 with each of the modules 420, 430, 440 coupled together and emitting a focused beam 418. A laser beam coupled into the collimator module 420 is collimated and the collimated beam is directed to the wobbler module 430. The wobbler module 430 moves the collimated beam using the mirrors and directs the moving collimated beam to the core block module 440. The core block module 440 then focuses the moving beam and the focused beam 418 is directed to a workpiece (not shown).

Figure 6:
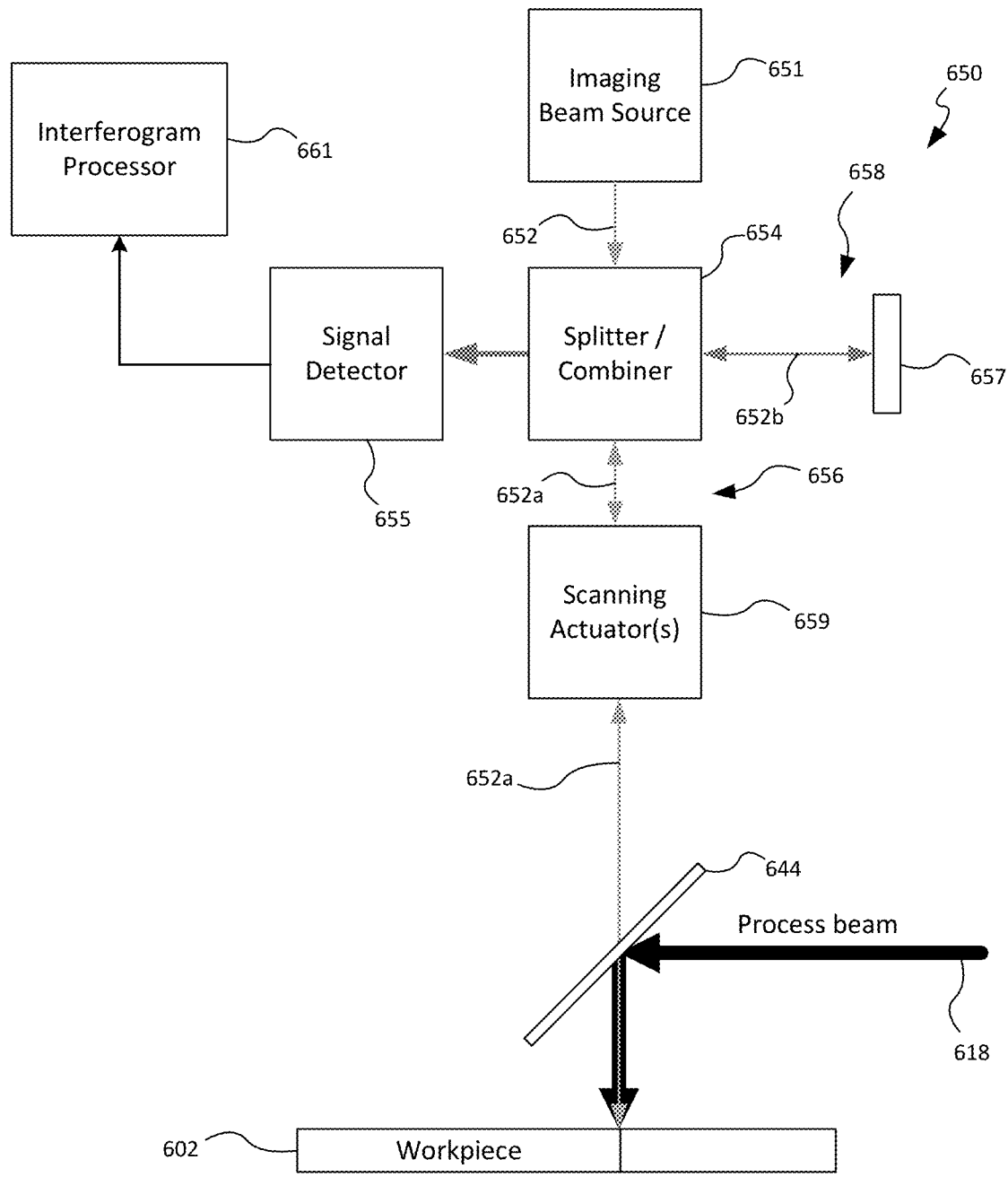
FIG. 6 is schematic block diagram of an ICI system that may be used to monitor wobble-welding, consistent with embodiments of the present disclosure.

FIG. 6 shows an example of an ICI system 650 including an interferometer configuration and using low coherence interferometry to monitor a wobble welding system as described above. The illustrated embodiment uses a Michelson-style interferometer; however, ICI systems with other interferometry configurations, such as Mach-Zehnder, may also be used with a wobble-welding system and are within the scope of the present disclosure.

The ICI system 650 includes an imaging beam source 652 for generating one or more imaging beams 652 and a splitter/combiner 654 for splitting the imaging beam(s) 652 such that at least one imaging beam component 652*a* is directed toward a workpiece 602 (i.e., applied to a sample arm 656) and at least one imaging beam component 652*b* is directed toward a reference mirror 657 (i.e., applied to a reference arm 658). In the illustrated embodiment, the imaging beam component 652*a* directed toward the workpiece 602 passes through a dichroic mirror 644 that reflects a process beam 618 used to perform the wobble welding. Other combining optics may also be used to combine the imaging beam component 652*a* with the process beam 618 while allowing the reflected imaging beam component 652*a* to pass back toward the combiner 654.

The reflected imaging beam components from the workpiece 602 and the reference mirror 657 are then combined by the splitter/combiner 654 to provide a combined signal as an interferometry output. The ICI system 650 further includes a signal detector 655, such as a high speed spectral detector, to receive and detect the combined signal formed from the reflected imaging beam components 652*a*, 652*b*, thereby producing an interferogram from the interferometry output. The interferogram may be provided to an interferogram processor 661 to process the interferogram and calculate measurements (e.g., depth measurements) therefrom. The interferogram processor 661 may be part of the ICI system 650 or the control system 160 shown in FIG. 1.

In this embodiment, the ICI system 650 further includes one or more imaging beam scanning actuators 659, such as a 2-axis galvo scanner or other active deflection devices, for scanning the imaging beam component 652*a* independently of the process beam 618. The scanning actuators 659 may be used, for example, to scan the imaging beam component 652*a* to remain substantially aligned with the process beam 618 as it moves in a wobble pattern. The scanning actuators 659 may also be used to scan the imaging beam component 652*a* in various scan patterns encompassing the wobble pattern of the process beam 618, as will be described in greater detail below. In other embodiments, the ICI system 650 may include multiple sample arms 656 and/or multiple reference arms 658. For example, multiple reference arms 658 with different optical path lengths may be used to account for changes in optical path length when the imaging beam component 652*a* is scanned.

Figure 7:
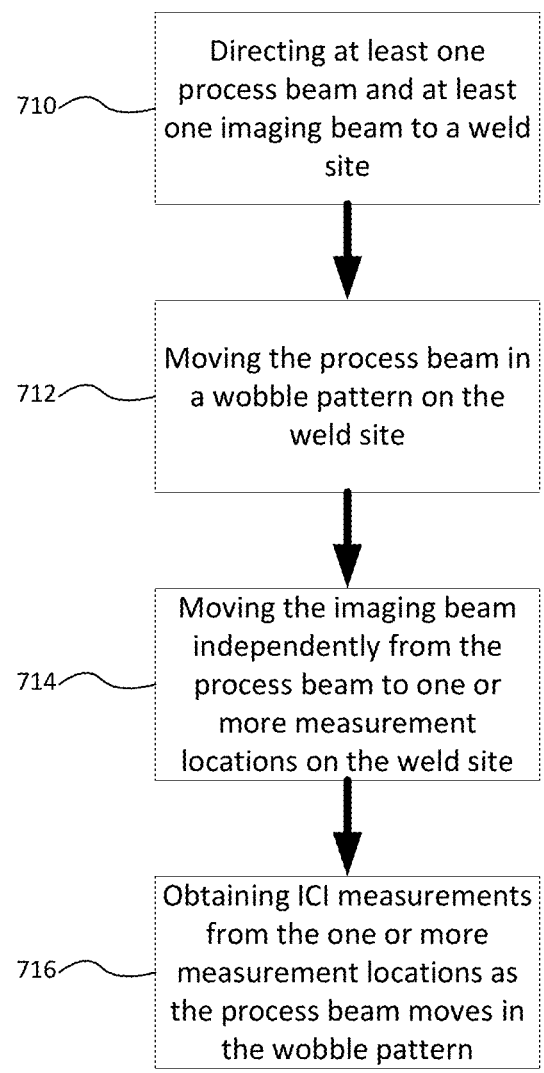
FIG. 7 is a flow chart illustrating a method of monitoring wobble-welding using ICI, consistent with embodiments of the present disclosure.

Referring to FIG. 7, a method of monitoring wobble welding using ICI is shown and described. The method includes directing 710 at least one process beam (e.g., process beam 118, 618) and at least one imaging beam (e.g., imaging beam 152, 652*a*) from an ICI system to a weld site. The process beam is moved 712 in a wobble pattern on the weld site, for example, as described above. The imaging beam is moved 714 at least partially independently from the process beam to one or more measurement locations on the weld site including, for example, on the wobble pattern. ICI measurements are obtained 716 from the one or more measurement locations as the process beam moves in the wobble pattern. The imaging beam may be moved to obtain the ICI measurements at different locations allowing various aspects of the wobble-welding to be evaluated including, for example, keyhole and/or melt pool characteristics, as described in greater detail below. The imaging beam may also be moved along the same wobble path and substantially aligned with the process beam. The imaging beam may also be dithered or wobbled locally at the one or more measurement locations.

The ICI measurements may also be used to control the wobble-welding process, for example, by adjusting one or more processing parameters and/or the wobble movement of the process beam. Examples of control include feedback control, for example, as described in U.S. Pat. Nos. 8,822,875, 9,757,817 and 10,124,410, which are commonly-owned and fully incorporated herein by reference.

Figure 8:
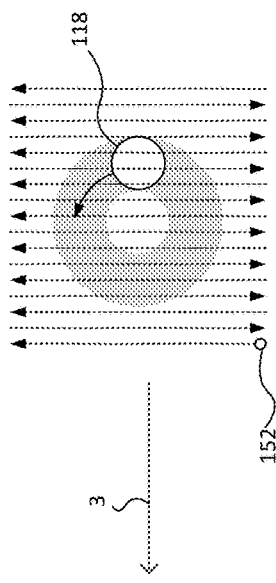
FIG. 8 is an illustration of one example of monitoring wobble-welding using ICI by moving an imaging beam with a raster scan pattern across a weld site and encompassing a process beam wobble-pattern.
Figure 9:
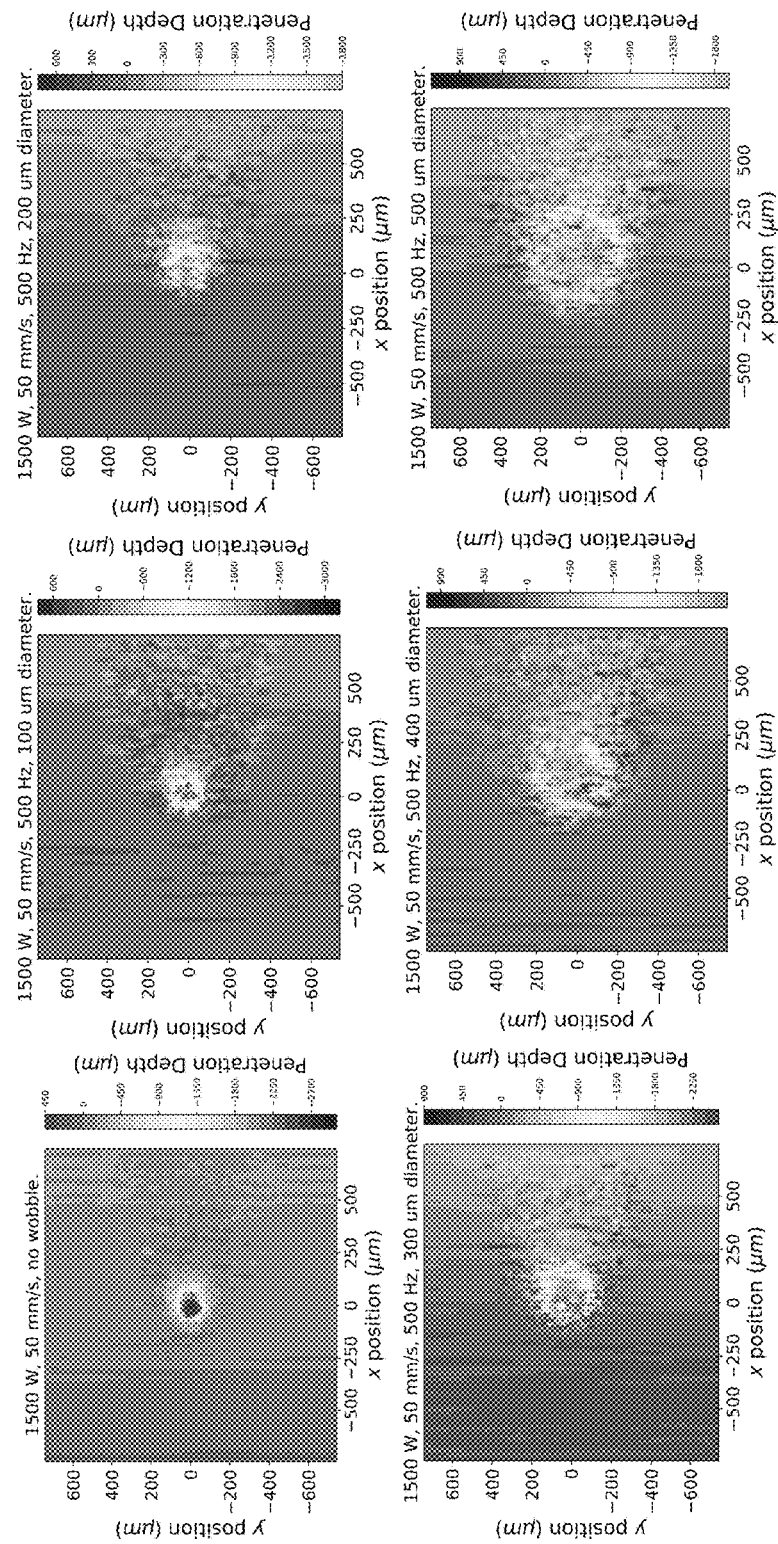
FIG. 9 illustrates averaged depth maps for welds in stainless steel with a circular wobble pattern and varying wobble diameters formed by raster scanning the imaging beam as shown in FIG. 8.

Referring to FIGS. 8 and 9, one embodiment of monitoring a wobble-welding process using ICI includes moving the imaging beam 152 to raster scan the weld site in a scan pattern across multiple measurement locations encompassing the wobble pattern to form a depth map of the weld site. In one example, the process beam 118 was wobbled with a circular pattern and moved in welding direction 3 to carry out linear bead-on-plate welds in stainless steel (304) coupons. During each weld, the ICI measurement beam or imaging beam was raster-scanned through a square grid pattern measuring 1.5 by 1.5 mm, centered on the process beam axis (when static). Depth measurements from each point in the grid pattern were combined to form asynchronous three-dimensional images of the weld site. Process parameters were held constant according to Table 1 below, except for the wobble pattern diameter, which was varied from 0 μm (equivalent to a fixed-optic weld) to 500 μm. Three-dimensional images of successive welds were combined by calculating the mean depth at each location in (x,y) to build up a representative depth map of the material surface including virgin steel, keyhole, and melt pool.

TABLE 1

Process parameters for keyhole shape experiments

| Parameter | Value |
| --- | --- |
| Laser Power | 1500 W |
| Material feed rate | 50 mm/s |
| Laser Spot Size | 200 μm |
| Wobble frequency | 500 Hz |
| Wobble diameter | 0-500 μm (varied) |
| Wobble shape | Circular |

TABLE 2

Process parameters for keyhole stability at fixed points.

| Parameter | Value |
| --- | --- |
| Laser Power | 3000 W |
| Material feed rate | 50 mm/s |
| Laser spot size | 200 μm |
| Wobble frequency | 500 Hz |
| Wobble diameter | 500 μm |
| Wobble shape | Circular |

FIG. 9 shows averaged depth maps for welds in stainless steel with varying wobble diameters (e.g., no wobble, 100 μm, 200 μm, 300 μm, 400 μm and 500 μm) where welding direction is from right to left in the images. Each map is a combination of five successive three-dimensional images acquired during different welds with identical parameters. A qualitative change in the depth map can be seen between the 100 μm and 200 μm wobble diameters. For fixed-beam welding, and for the 100 μm beam wobbled case, the process produces a localized keyhole which is deep at the center of the image.

At 200 μm diameter and above, the melt pool begins to encroach on the center of the wobble pattern (e.g., as indicated by measured depths similar to the surface of the material). Above this diameter, the deeper measurements of the keyhole fall into a ring-shaped distribution. In this regime, the keyhole traces out a circular pattern within a larger melt pool, following the process beam through its motion. In other words, increasing the wobble diameter to the focused diameter of the process beam resulted in a transition of the keyhole depth distribution from a single localized keyhole area to a revolving keyhole with a high central region of melt, level with the material surface.

These results are intuitive when considering the diameter of the process beam. For these experiments, the nominal 1/e^2 beam diameter at focus was 200 μm. When the wobble diameter is increased to match the beam diameter, there is no longer an appreciable area of intensity overlap at center throughout each revolution of the process beam. This results in a deficit of evaporation recoil pressure on the process axis when compared to smaller-diameter wobble patterns, and causes the keyhole to transition to a distinct orbiting motion. For wobble diameters smaller than the beam diameter, the keyhole depth distribution appears to be more similar to that of a fixed-beam keyhole. There may still be some small-scale orbiting of the keyhole following the process beam in this regime, which would not be visible in the images shown in FIG. 9. This could affect melt pool dynamics and overall process stability in a manner not possible when using a larger-diameter beam with an equivalent time-averaged intensity distribution.

Figure 10:
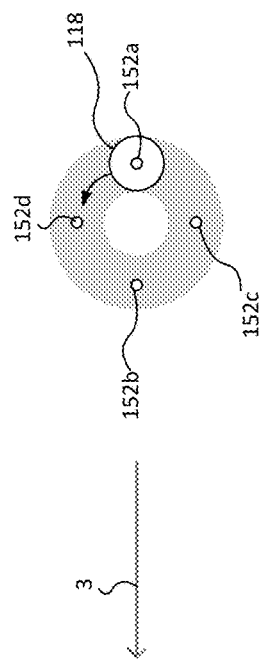
FIG. 10 is an illustration of another example of monitoring wobble-welding using ICI by moving an imaging beam to a plurality of fixed measurement locations along a process beam wobble-pattern.
Figure 11:
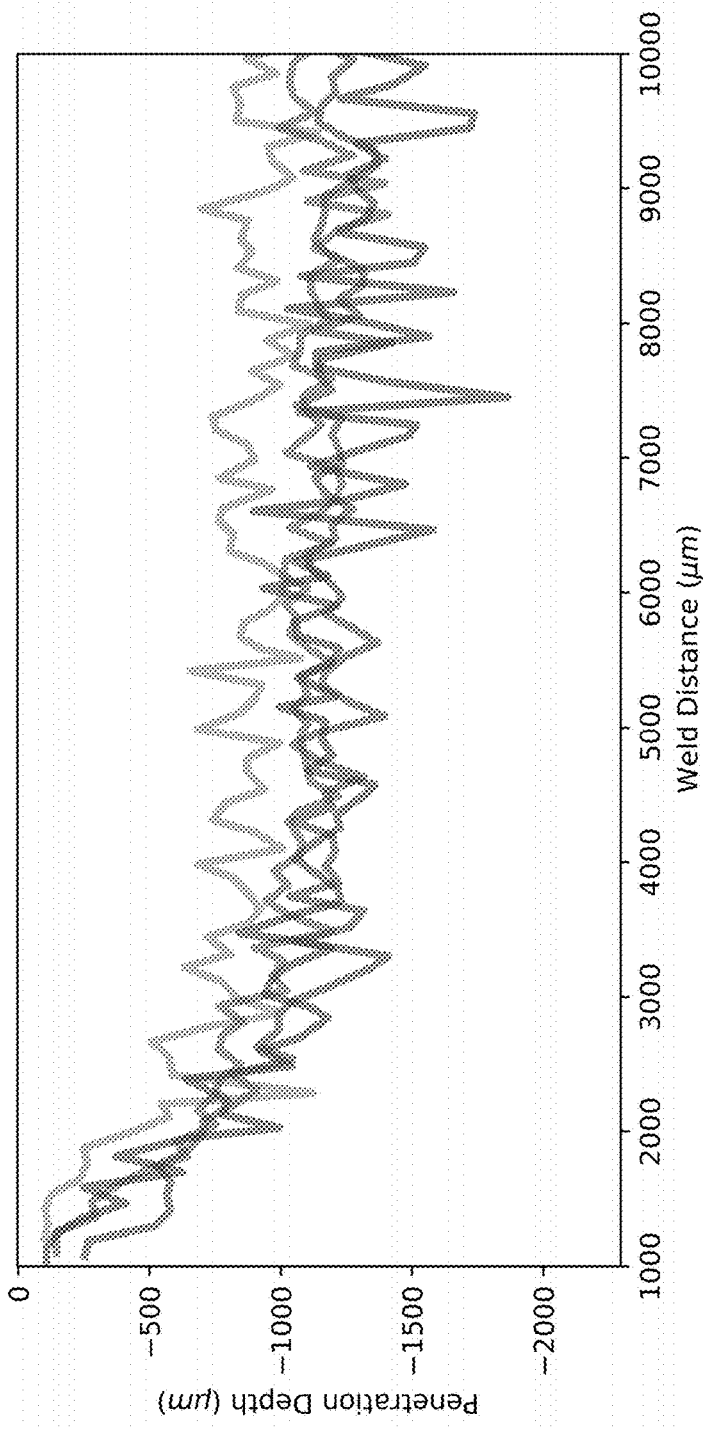
FIG. 11 is a plot of the penetration depth as a function of weld distance measured at the fixed measurement locations as shown in FIG. 10.
Figure 12:
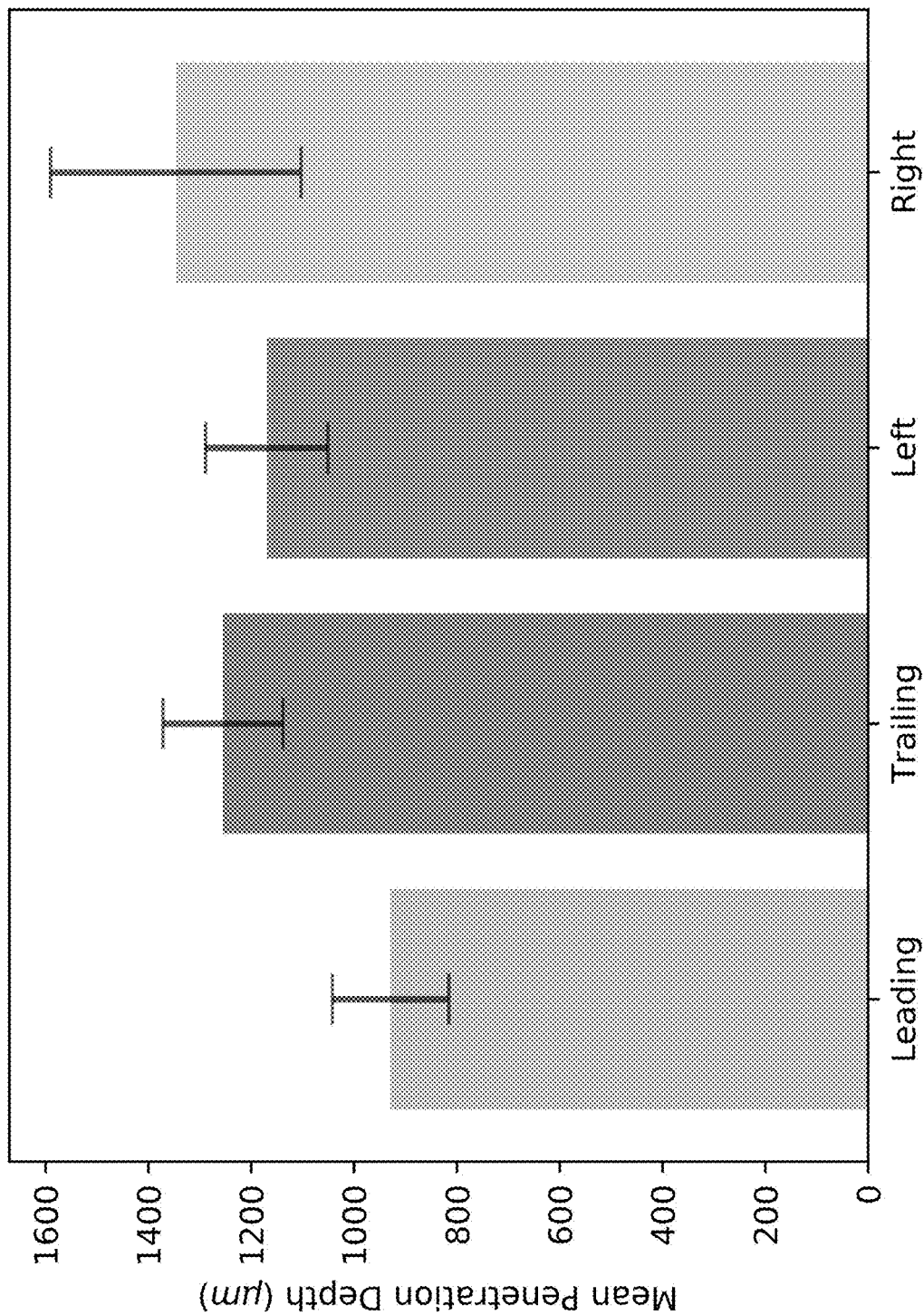
FIG. 12 is a bar graph of the average penetration depth measured at the fixed measurement locations as shown in FIG. 10.

Referring to FIGS. 10-12, another embodiment of monitoring a wobble-welding process using ICI includes moving the ICI imaging beam 152 to one or more fixed locations along the wobble pattern to obtain fixed ICI measurements at the location(s). In one example, the process beam 118 was wobbled with a circular wobble pattern and moved in welding direction 3 to produce linear bead-on plate welds in copper (110) with a goal of observing and comparing keyhole depth oscillation stability at specific fixed points within the wobble pattern. Keyhole measurements were acquired continuously at fixed locations in the wobble pattern for the entire duration of each weld. Different measurement positions were examined during successive welds with identical parameters according to Table 2 below.

In this example, static ICI depth measurements were acquired at the four cardinal points (e.g., 152a-d) around the circular wobble pattern. The two points (e.g., 152a, 152b) along the axis parallel to the welding direction will be referred to as leading (152a) and trailing (152b), and the two points (e.g., 152c, 152d) along the axis perpendicular to the welding direction 3 will be referred to as fast (152c) and slow (152d). The motion of the process beam combined with the travel speed of the head relative to the part creates an asymmetry in the local travel speed of the beam between the fast and slow sides of the wobble pattern. Based on the wobble parameters, the circumferential speed of the process beam in the frame of reference of the process head was 785 mm/s. On the fast side of the wobble pattern, the process beam travelled at 835 mm/s in the forward welding direction 3 (relative to the material), while on slow side of the wobble pattern, the beam travelled at 735 mm/s toward the rear of the weld.

Depth data acquired in this manner includes measurements from the bottom of the keyhole when the process beam 118 crosses through the measurement beam (152a-d), and measurements from the surface of the melt pool at other times. The depth data was reduced to a set of keyhole minima by searching for a local minimum within each expected crossing interval of the two beams. FIG. 11 shows resulting keyhole depths for all four measurement locations (i.e., the leading, trailing, slow, and fast edges of the wobble pattern) during different bead-on-plate welds in copper with identical parameters. FIG. 12 shows mean depths and standard deviations for each of these measurement locations on the cardinal points of a circular wobble pattern.

Each of the four depth measurement sets in FIG. 11 displays its own characteristic depth and stability traits. The leading and trailing measurements show a marked difference in penetration depth (e.g., approximately 400 μm). When the keyhole moves across the trailing edge of the wobble pattern (closest to the majority of the melt volume), it reaches greater penetration depths than it does on the leading edge of the pattern. The slow and fast edges of the pattern exhibit differences in both depth and stability. The slow edge of the wobble pattern is observed to reach greater depths on average than the fast edge of the pattern. This increased penetration on the slow edge is accompanied by a greater variability of the depth measurements when compared with the other measurement locations. The deeper 'spikes' observed in the fast edge data are consistent with this being the least stable region of the keyhole orbit for the parameters tested here. In addition to the differences in surface speed of the process beam between the slow and fast sides of the wobble pattern, this asymmetry may also be due in part to melt dynamics induced by a stirring effect of the moving keyhole.

Figure 13:
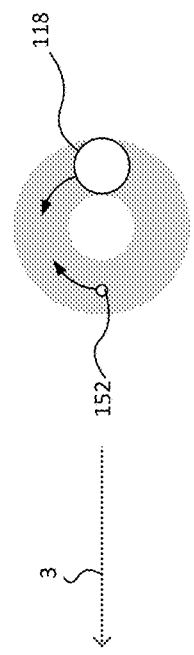
FIG. 13 is an illustration of a further example of monitoring wobble-welding using ICI by moving an imaging beam in a direction opposite the direction of the process beam along the wobble-pattern.
Figure 14:
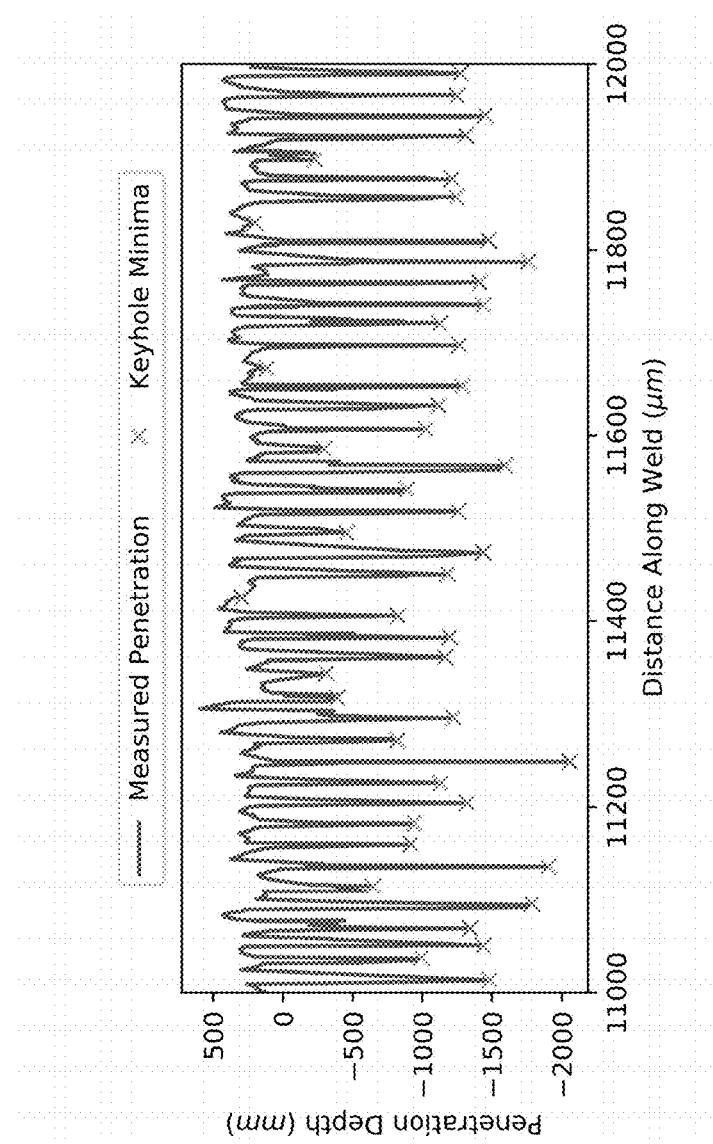
FIG. 14 is a plot of penetration depth as a function of distance along a weld measured as the imaging beam moves as shown in FIG. 13.
Figure 15:
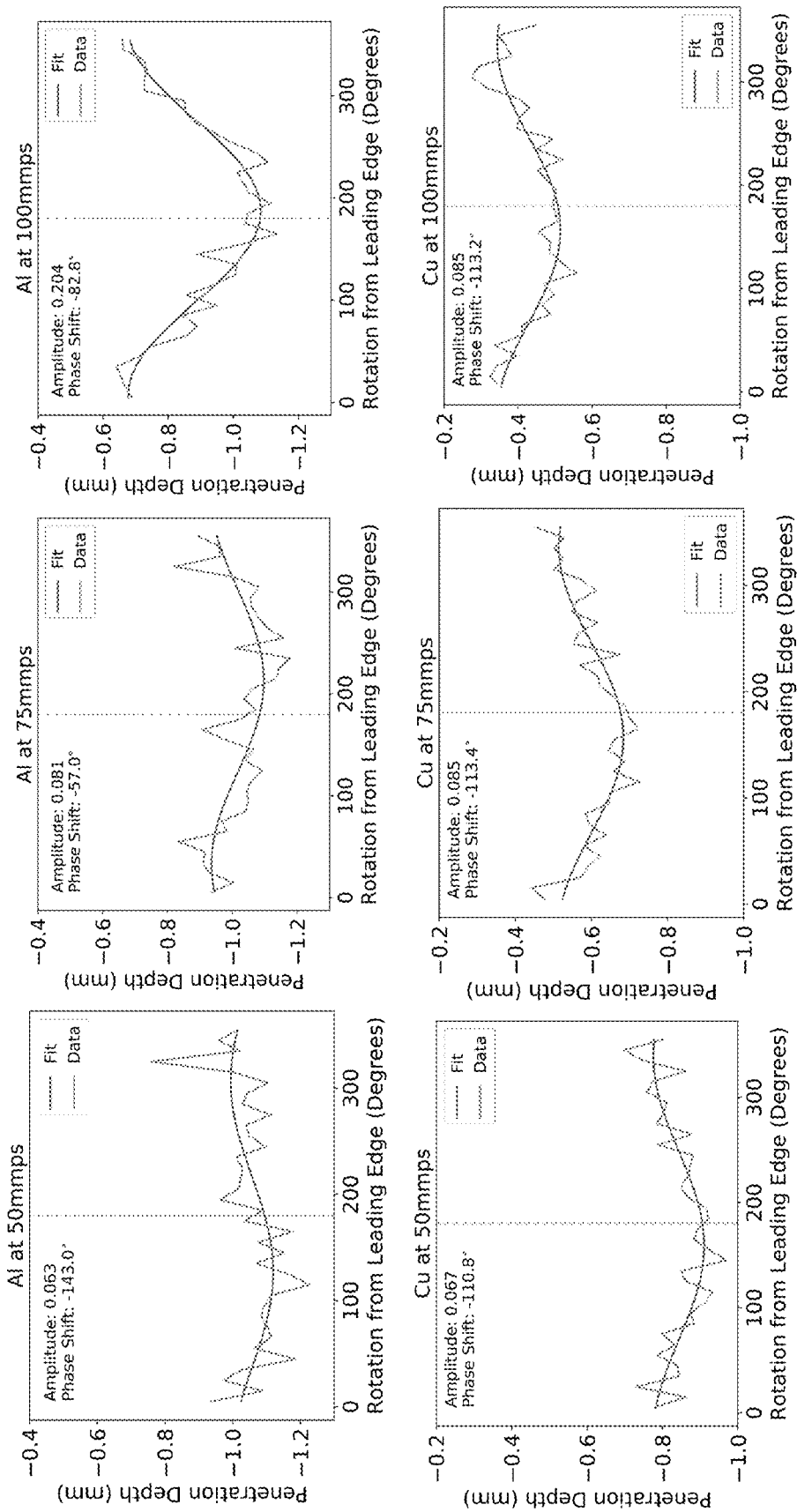
FIG. 15 shows plots of the mean penetration depth as a function of rotation angle at different welds speeds as the imaging beam moves as shown in FIG. 13.

Referring to FIGS. 13-15, a further embodiment of monitoring a wobble-welding process using ICI includes moving the imaging beam 152 along the wobble pattern in a direction opposite to movement of the process beam 118 and in synchronization with the wobble period. In one example, the process beam 118 was wobbled with a circular pattern and moved in welding direction 3 to produce linear bead-on-plate welds in copper (110) and aluminum (6061) in order to assess the variation of the keyhole depth within the wobble pattern. Welding parameters were kept constant for each material except for the welding speed, which was varied, as indicated in Table 3 below. The ICI measurement beam or imaging beam 152 was counter-rotated relative to the process beam 118, resulting in multiple crossings of the keyhole and measurement beam per wobble period.

TABLE 3

Process parameters for keyhole depth variation within the wobble pattern.

| Parameter | Value |
|---|---|
| Laser Power | Aluminium: 1500 W |
| | Copper: 3000 W |
| Material feed rate | 50, 75, 100 mm/s |
| Laser spot size | 200 µm |
| Wobble frequency | 500 Hz |
| Wobble diameter | 500 µm |
| Wobble shape | Circular |

The resulting depth information includes measurements of the keyhole (when the beams are aligned) and the melt pool surface (when the beams are at different locations around the wobble path). The measurement and process beams met at regular intervals determined by their respective rotation frequencies, herein referred to as a 'crossing interval'. A set of keyhole minima were extracted from each set of depth data by searching for a local minimum within each expected crossing interval. FIG. 14 shows keyhole depths measured from the leading, trailing, left and right points of the wobble pattern during bead-on-plate welds in copper, where each location in the wobble pattern exhibits different depth and stability characteristics.

These keyhole minima were than graphed as a function of polar angle around the process axis. The depth values were binned on 10-degree intervals around the circular wobble pattern, and the mean and standard deviation for each bin were calculated. To help characterize the magnitude of the keyhole variation, as well as the orientation of the keyhole depth extrema relative to the welding direction, a sinusoid was fitted to each set of depths using only phase and amplitude as free variables. FIG. 15 shows the mean penetration depth of the keyhole minima as a function of rotation angle around the wobble pattern for welds in copper and aluminum at different welding speeds. The mean penetration in each case is fitted with a sinusoid to help assess both the amount of depth variability present and the orientation of the penetration depth extrema relative to the direction of weld travel. In each graph, the trailing direction is marked by the dashed line at 180 degrees, the slow side of the wobble pattern is at 90 degrees, and the fast side is at 270 degrees.

Based on the results shown in FIG. 15, two different effects may exert an influence on the keyhole depth at different locations around the wobble pattern. The first effect assumes keyhole depth changes as a function of the travel speed of the process beam over the material surface. In isolation, this effect would tend to bias the keyhole depth extrema toward the slow and fast edges of the wobble pattern, where the maximum and minimum process beam travel speeds occur. The second effect assumes keyhole depth changes as a function of material temperature, which is influenced by proximity to the majority of the melt volume (which trails behind the process). In theory, once the weld has progressed long enough for the melt pool to be fully established, the material upon which the process beam is incident at the trailing edge of the wobble pattern should be at a higher temperature than that at the front edge.

Based on the results in FIG. 15, for both aluminum and copper, the depth extrema appear to occur toward the leading/trailing axis of the wobble pattern. This is consistent with proximity to the trailing melt volume acting as the dominant effect on keyhole depth within the wobble pattern. One would still expect some bias to either the slow or fast side of the wobble pattern based on surface speed effects. Such a trend appears to be present in the copper welds, with all exhibiting a shift of the depth maximum of roughly 20 degrees toward the slow side of the wobble pattern. The aluminum results do not display a consistent trend toward either slow or fast edges, but the aluminum depth data was noticeably noisier than the copper data and this may have caused inconsistencies in the position of the fitted depth extrema. In the case of this specific process in aluminum, the dominant keyhole depth variation appears to be between the leading and trailing edges of the wobble pattern.

Although examples of imaging beam scan patterns are described above, other imaging beam scan patterns are possible and within the scope of the present application.

In further embodiments, a wobble welding process may be monitored using an ICI system by moving the imaging beam in the direction of the process beam and with synchronization to the wobble period. The imaging beam may be moved in the direction of the process beam, but independently of the process beam, for example, to provide dynamic offset control and/or to allow cyclic alignment correction. The imaging beam may be aligned substantially coaxially with the process beam or may be aligned to lag the process beam to monitor features that lag the process beam, for example, by an amount related to the processing velocity. As described above, in certain wobble patterns, the processing velocity changes cyclically around the wobble pattern. In a circular wobble pattern, for example, there is a slow side and a fast side of the wobble pattern and thus the desired alignment of the imaging beam may be impacted as the beams move along the circular wobble pattern.

To provide cyclic alignment correction, the control system may be programmed such that the imaging beam scanning actuator(s) move the imaging beam relative to the process beam to correct alignment of the imaging beam relative to the process beam based, at least in part, on a position of the beams on the wobble pattern. In a circular wobble pattern, for example, the alignment may be changed cyclically for the slow side and the fast side. The cyclic alignment correction may also be based on other parameters such as the process speed, the material type, and the material thickness.

In some embodiments, the control system of the laser welding system described herein may be programmed to provide dynamic offset control of the imaging beam based on one or more other factors or parameters. These factors or parameters include, without limitation: the position of the process beam within its wobble pattern; the process beam wobble pattern (e.g., wobble geometry, wobble amplitude, and/or wobble period); workpiece geometry; a lookup table comprised of offset parameters based on material and welding process parameters; thermomechanical welding models; ICI measurements of prior welding processes; prior ICI measurements within the same welding process; at least one component of the instantaneous velocity vector of the process beam relative to the material; the curvilinear welding path across the material; and one or more corrections to the laser beam delivery system (e.g., chromatic aberration field corrections, focal plane field corrections, spot size field corrections, and/or beam shaping corrections). Alternatively or additionally, the ICI measurements may also be corrected (e.g., using data processing systems) based on one or more of the above factors or parameters, for example, to smooth out ICI measurements and ensure uniformity in a welding process.

The systems and methods described herein may be used to monitor weld penetration profile. In one example, the ICI system may scan the imaging beam transverse to the weld direction at various points along the weld (e.g., using raster scanning) to produce an indication of weld penetration profile transverse to the weld direction at those locations. In another example, the ICI system may scan the imaging beam along the weld direction to produce an indication of the weld penetration profile along the weld direction at various points along the weld. In a further example, the ICI system may scan the imaging beam to produce an indication of the weld penetration profile along a virtual cross section defined by an arbitrary geometrical surface. The control system may be configured to adjust the laser power based on weld penetration measurements from the ICI system at more than one location during a wobble cycle. In particular, the control system may be configured to adjust the laser power in order to reduce the weld penetration variation throughout a wobble cycle. As mentioned above, the ICI measurements may be corrected based on one or more additional factors or parameters, for example, to ensure that wobble weld depths yield a uniform depth for quality assurance and/or that the wobbled weld bead is not shifted.

In further embodiments, the control system may adjust processing based on part measurement outputs from the ICI system. The control system may be configured, for example, to adjust the process beam wobble pattern based on pre-process part measurement outputs and/or post-process part measurement outputs from the ICI system.

The welding system may also control the measuring beam relative to the process beam in other ways. Where the ICI system is coupled upstream of the scanning actuators in the wobble head, for example, the control system may be programmed to move the imaging beam scanning actuators complementary to the process beam scanning actuators and in a synchronized fashion such that the imaging beam is effectively decoupled from the process beam wobble pattern on the workpiece surface. Alternatively or additionally, the control system may be programmed to toggle the process beam scanning actuators between their wobble pattern and a fixed position to achieve ICI measurements of the workpiece surface that are decoupled from the wobble pattern. The control system may also be programmed to trigger ICI system measurements such that they are temporally synchronized with the wobble cycle.

One of the primary advantages of wobble welding is in its beneficial effect on the quality joining of dissimilar metals, such as permutations of the common engineering alloys of copper, aluminum, steel, stainless steel, titanium and various coated or plated versions thereof. The joining of dissimilar metals has utility in various applications including, without limitation, electrified transportation systems (e.g. automobiles, trains and aircraft).

Once an effective means of measuring the penetration depth and/or process dynamics are configured using a wobble head and an ICI system, the ICI measurements can have particular use as a proxy for the amount of mixing between the materials that comprise the welding joint. For example, when overlap welding copper and aluminum, insufficient mixing results in a poor mechanical and electrical connection. Too much mixing creates embrittlement due to the significant presence of intermetallic phases. With ICI observation and/or ICI-based control of the joining process, these aspects of the metallurgy of the weld may be monitored for quality assurance and/or controlled to compensate for variations in the manufacturing process, feedstock material and the environment. This process is aided by a pre-start calibration and comparison to metallurgical analysis Accordingly, inline coherent imaging (ICI) may be used advantageously to monitor wobble-welding even with the complex wobble patterns formed by the process laser. Using various techniques to move the imaging beam to different measurement locations various aspects of wobble-welding may be monitored including keyhole depth and stability as well as melt pool formation.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser material processing system comprising:
   a material modification beam source for generating a process beam;
   a processing head coupled to the material modification beam source and including at least one process beam scanning actuator, for directing and moving the process beam according to a wobble pattern in at least one axis on a processing site of a workpiece;
   an inline coherent imaging (ICI) system optically coupled to the processing head, the ICI system including at least one imaging beam scanning actuator for positioning the imaging beam independently of the process beam; and
   a control system for controlling at least the material modification beam source, the process beam scanning actuator, and the imaging beam scanning actuator, wherein the control system is programmed to cause the processing head to scan the process beam in the wobble pattern, and wherein the control system is programmed to cause the imaging beam scanning actuator to move the imaging beam to a plurality of measurement locations on the processing site independently of the process beam and in coordination with the wobble pattern such that the imaging beam is
   dynamically offset from the process beam at the workpiece surface at least in part according to a position of the process beam within the wobble pattern, or
   moved relative to the process beam to correct alignment of the imaging beam relative to the process beam based at least in part on a position of the beams on the wobble pattern.

2. The laser material processing system of claim 1 wherein the processing head is a welding head for directing and moving the process beam according to the wobble pattern on a weld site.

3. The laser material processing system of claim 1 wherein the material modification beam source is a fiber laser.

4. The laser material processing system of claim 1 further comprising at least one motion stage for translating at least one of the processing head and the workpiece relative to each other while the processing beam is moved in the wobble pattern on the workpiece.

5. The laser material processing system of claim 1 wherein the ICI system is optically coupled to the processing head downstream of the at least one process beam scanning actuator.

6. The laser material processing system of claim 5 wherein the control system is programmed to cause the imaging beam scanning actuator to move the imaging beam along the wobble pattern in a direction opposite to movement of the process beam and with synchronization to the wobble pattern.

7. The laser material processing system of claim 5 wherein the control system is programmed to cause the imaging beam scanning actuator to move the imaging beam along the wobble pattern in a direction of the process beam and with synchronization to a wobble pattern.

8. The laser material processing system of claim 1 wherein the ICI system is optically coupled to the welding head upstream of the at least one process beam scanning actuator.

9. The laser material processing system of claim 1 wherein the control system is programmed to cause the imaging beam scanning actuator to move the imaging beam such that the imaging beam scans the processing site in a scan pattern at least partially encompassing a wobble pattern.

10. The laser material processing system of claim 1 wherein the control system is configured to control the process beam scanning actuator to adjust at least one of wobble geometry, wobble period, wobble speed, and wobble amplitude in response to measurements from the ICI system.

11. The laser material processing system of claim 1 wherein the control system is configured to control power of the process beam in response to measurements from the ICI system.

12. The laser material processing system of claim 1 wherein the process beam scanning actuator is configured to move the process beam with a maximum beam displacement at the workpiece of ±30 mm.

13. The laser material processing system of claim 1 wherein the process beam scanning actuator is configured to move the process beam by a maximum beam angle displacement of ±5° to provide a wobble amplitude.

14. The laser material processing system of claim 1 wherein the at least one process beam scanning actuator and the at least one imaging beam scanning actuator are selected from the group consisting of galvanometer scanning mirrors, polygon scanning mirrors, MEMs-based scanning mirrors, piezoelectric scanning mirrors, and diffraction-based beam scanners.

15. The laser material processing system of claim 1 further comprising an auxiliary measurement system configured to measure process radiation.

16. The laser material processing system of claim 15 wherein the auxiliary measurement system measures process radiation within a spectral band of 100 nm to 1 mm.

17. The laser material processing system of claim 15 wherein the auxiliary measurement system includes optical elements to perform a spatially localized measurement relative to the process beam.

18. The laser material processing system of claim 17 wherein the auxiliary measurement system is configured to perform the spatially localized measurement at a measurement location dynamically offset from the process beam based on at least one output from the ICI system.

19. The laser material processing system of claim 15 wherein the auxiliary measurement system includes optical elements to perform a spatially localized measurement relative to the imaging beam.

20. The laser material processing system of claim 15 wherein the control system is programmed to cause the imaging beam actuator to move the imaging beam such that the imaging beam is dynamically offset from the process beam based on at least one output of the auxiliary measurement system.

* * * * *